(12) United States Patent
Hwang

(10) Patent No.: US 10,948,610 B2
(45) Date of Patent: Mar. 16, 2021

(54) ANALYSIS SYSTEM FOR AVIATION RADIATION DOSE

(71) Applicants: Korea Astronomy and Space Science Institute, Daejeon (KR); Korea Meteorological Administration, Seoul (KR)

(72) Inventor: Junga Hwang, Daejeon (KR)

(73) Assignees: Korea Astronomy and Space Science Institute, Daejeon (KR); Korea Meteorological Administration, Seoul (KR)

( * ) Notice: Subject to any disclaimer, the term of this patent is extended or adjusted under 35 U.S.C. 154(b) by 441 days.

(21) Appl. No.: 15/675,304

(22) Filed: Aug. 11, 2017

(65) Prior Publication Data

US 2018/0045836 A1    Feb. 15, 2018

(30) Foreign Application Priority Data

Aug. 11, 2016  (KR) .................... 10-2016-0102425

(51) Int. Cl.
  *G01T 1/02*    (2006.01)
(52) U.S. Cl.
  CPC .................. *G01T 1/02* (2013.01)
(58) Field of Classification Search
  CPC ........................................ G01T 1/02
  USPC ........................................ 702/190
  See application file for complete search history.

(56) References Cited

U.S. PATENT DOCUMENTS 9,435,659 B1 * 9/2016 Kozloski .......... G01C 21/3461

FOREIGN PATENT DOCUMENTS

KR   10-2010-0060704 A    6/2010
KR   20100060704    *  9/2011  ............ G01C 21/04

OTHER PUBLICATIONS

KR-20100060704 translation (Year: 2011).*
Badhwar O'Neill 2011 Galactic Cosmic Ray Model Update and Future Improvement (Year: 2014).*
Junga Hwang et al., "Modeling of Space Radiation Exposure Estimation Program for Pilots, Crew and Passengers on Commercial Flights", J. Astron. Sci., vol. 31 (1), Mar. 2014, p. 25-31.
KJunga Hwang et al., "Safety Standards and Management Policy on the Polar Route Space Radiation", Journal of Aviation Development of Korea, vol. 53, Apr. 2010, p. 73-89.

* cited by examiner

*Primary Examiner* — Michael P Nghiem
*Assistant Examiner* — Dacthang P Ngo
(74) *Attorney, Agent, or Firm* — Rabin & Berdo, P.C.

(57) ABSTRACT

An analysis system for an aviation radiation dose includes: a proton spectrum generator which generates a galactic cosmic ray incident on the Earth's atmosphere and a proton spectrum corresponding to a solar proton event; a global radiation dose map producer which generates-particle transport and produces a radiation dose map; a global radiation dose map converter which converts the radiation dose map based on a standard atmosphere into a radiation dose map corresponding to current atmosphere conditions in real time; and a database in which data necessary for operations of the proton spectrum generator, the global radiation dose map producer and the global radiation dose map converter is previously calculated and stored, thereby having an effect on estimating any radiation route dose if information about an arbitrary path and time is given.

9 Claims, 21 Drawing Sheets

Table A1.7. Fluence-to-effective dose conversion coefficients (Sv.cm$^2$) as a function of proton incident energy for different geometrical conditions of irradiation of an anthropomorphic mathematical model[17].

| Proton energy (GeV) | AP | | PA | | LAT | | ISO | |
|---|---|---|---|---|---|---|---|---|
| 5.0E-03 | 5.75E-11 | 0.2% | 5.92E-11 | 0.1% | 3.81E-11 | 0.2% | 4.18E-11 | 0.6% |
| 1.0E-02 | 1.15E-10 | 0.2% | 1.18E-10 | 0.1% | 7.62E-11 | 0.1% | 8.39E-11 | 0.7% |
| 2.0E-02 | 2.89E-10 | 0.8% | 1.22E-10 | 0.7% | 1.34E-10 | 2.2% | 1.63E-10 | 1.5% |
| 3.0E-02 | 8.77E-10 | 1.8% | 1.03E-10 | 2.3% | 1.86E-10 | 2.4% | 2.91E-10 | 1.8% |
| 4.0E-02 | 2.54E-09 | 1.3% | 2.19E-10 | 2.7% | 3.72E-10 | 2.5% | 7.27E-10 | 4.2% |
| 5.0E-02 | 4.81E-09 | 0.9% | 5.56E-10 | 1.9% | 4.81E-10 | 3.1% | 1.25E-09 | 2.8% |
| 1.0E-01 | 6.82E-09 | 0.4% | 2.75E-09 | 0.6% | 2.50E-09 | 1.2% | 2.95E-09 | 1.3% |
| 2.0E-01 | 4.57E-09 | 1.4% | 4.79E-09 | 1.2% | 5.64E-09 | 2.4% | 4.54E-09 | 1.5% |
| 5.0E-01 | 2.84E-09 | 1.8% | 2.95E-09 | 2.1% | 2.77E-09 | 1.9% | 2.95E-09 | 3.6% |
| 1.0E+00 | 2.53E-09 | 2.1% | 2.65E-09 | 1.2% | 2.49E-09 | 1.7% | 2.68E-09 | 1.4% |
| 2.0E+00 | 2.42E-09 | 2.6% | 2.67E-09 | 1.9% | 2.51E-09 | 2.6% | 2.73E-09 | 3.4% |
| 5.0E+00 | 3.24E-09 | 3.2% | 3.38E-09 | 1.0% | 3.35E-09 | 3.4% | 3.65E-09 | 2.4% |
| 1.0E+01 | 3.73E-09 | 1.6% | 3.97E-09 | 1.1% | 4.55E-09 | 2.6% | 4.49E-09 | 3.5% |
| 5.0E+01 | 4.64E-09 | 4.4% | 5.24E-09 | 1.5% | 6.39E-09 | 3.2% | 6.47E-09 | 3.8% |
| 1.0E+02 | 4.87E-09 | 2.5% | 5.82E-09 | 1.5% | 7.65E-09 | 3.2% | 7.74E-09 | 2.5% |
| 1.0E+03 | 7.97E-09 | 2.5% | 1.01E-08 | 2.3% | 1.57E-08 | 4.2% | 1.68E-08 | 2.6% |
| 1.0E+04 | 1.35E-08 | 3.4% | 1.82E-08 | 2.1% | 3.42E-08 | 4.2% | 4.11E-08 | 4.3% |

FIG. 23

Table A1.6. Fluence-to-effective dose conversion coefficients (Sv.cm$^2$) as a function of neutron incident energy for different geometrical conditions of irradiation of an anthropomorphic mathematical model$^{(18)}$.

| Neutron energy (GeV) | AP | | PA | | LAT | | ISO | |
|---|---|---|---|---|---|---|---|---|
| 2.5E-11 | 8.65E-12 | 2.0% | 5.56E-12 | 4.4% | 2.31E-12 | 3.2% | 3.61E-12 | 3.0% |
| 1.0E-07 | 1.73E-11 | 3.0% | 1.18E-11 | 2.8% | 4.98E-12 | 2.1% | 7.28E-12 | 3.4% |
| 1.0E-05 | 3.31E-11 | 3.7% | 2.72E-11 | 4.7% | 1.09E-11 | 4.8% | 1.50E-11 | 4.5% |
| 1.0E-04 | 4.50E-11 | 1.7% | 3.53E-11 | 3.6% | 1.34E-11 | 3.6% | 1.91E-11 | 1.8% |
| 1.0E-03 | 2.91E-10 | 2.3% | 1.67E-10 | 2.3% | 8.48E-11 | 1.8% | 1.26E-10 | 2.8% |
| 1.0E-02 | 5.89E-10 | 2.8% | 4.83E-10 | 3.7% | 3.40E-10 | 0.9% | 3.93E-10 | 3.1% |
| 3.0E-02 | 3.93E-10 | 3.3% | 3.82E-10 | 2.3% | 3.07E-10 | 2.8% | 3.15E-10 | 3.4% |
| 5.0E-02 | 4.06E-10 | 2.6% | 4.12E-10 | 2.1% | 3.45E-10 | 4.8% | 3.48E-10 | 3.4% |
| 1.0E-01 | 4.85E-10 | 3.8% | 4.79E-10 | 3.0% | 4.04E-10 | 3.8% | 4.06E-10 | 2.4% |
| 2.0E-01 | 4.71E-10 | 4.0% | 5.24E-10 | 2.3% | 5.61E-10 | 3.3% | 5.58E-10 | 3.8% |
| 5.0E-01 | 5.58E-10 | 1.2% | 6.79E-10 | 3.9% | 6.63E-10 | 4.6% | 6.95E-10 | 3.0% |
| 1.0E+00 | 7.92E-10 | 2.7% | 8.74E-10 | 2.1% | 8.92E-10 | 3.8% | 8.86E-10 | 2.6% |
| 2.0E+00 | 9.80E-10 | 3.5% | 1.02E-09 | 1.6% | 1.15E-09 | 3.5% | 1.16E-09 | 3.1% |
| 5.0E+00 | 1.59E-09 | 0.8% | 1.88E-09 | 1.6% | 2.16E-09 | 4.8% | 2.01E-09 | 3.5% |
| 1.0E+01 | 2.08E-09 | 1.1% | 2.47E-09 | 2.0% | 3.05E-09 | 4.4% | 3.01E-09 | 4.8% |
| 5.0E+01 | 2.97E-09 | 4.0% | 3.65E-09 | 1.9% | 4.85E-09 | 2.7% | 4.98E-09 | 2.7% |
| 1.0E+02 | 3.48E-09 | 4.0% | 4.33E-09 | 1.6% | 6.45E-09 | 3.3% | 6.92E-09 | 3.7% |
| 1.0E+03 | 6.55E-09 | 2.0% | 8.45E-09 | 2.0% | 1.43E-08 | 4.3% | 1.67E-08 | 3.7% |
| 1.0E+04 | 1.15E-08 | 3.6% | 1.78E-08 | 2.3% | 3.31E-08 | 4.3% | 3.67E-08 | 4.7% |

The data in the energy range 0.5-10 GeV for AP irradiation have been recently recalculated improving the statistical accuracy.

FIG. 24

*M. PELLICCIONI*

Table A1.2. Fluence-to-effective dose conversion coefficients (Sv.cm$^2$) as a function of electron incident energy for different geometrical conditions of irradiation of an anthropomorphic mathematical model[16,19].

| Photon energy (GeV) | AP | | PA | | LAT | | ISO | |
|---|---|---|---|---|---|---|---|---|
| 0.005 | 7.19E-11 | 3.0% | 7.37E-12 | 1.9% | 8.95E-12 | 3.1% | 2.07E-11 | 4.3% |
| 0.01 | 1.52E-10 | 1.7% | 4.27E-11 | 1.1% | 2.05E-11 | 2.3% | 5.12E-11 | 4.3% |
| 0.02 | 2.48E-10 | 1.8% | 1.24E-10 | 2.4% | 8.11E-11 | 1.8% | 1.12E-10 | 4.7% |
| 0.03 | 2.99E-10 | 1.9% | 2.64E-10 | 3.2% | 1.36E-10 | 2.0% | 1.63E-10 | 4.6% |
| 0.04 | 3.26E-10 | 2.6% | 3.22E-10 | 3.0% | 1.90E-10 | 3.3% | 2.06E-10 | 4.5% |
| 0.05 | 3.37E-10 | 2.6% | 3.41E-10 | 2.8% | 2.30E-10 | 1.9% | 2.45E-10 | 3.2% |
| 0.1 | 3.58E-10 | 3.3% | 3.64E-10 | 1.9% | 3.29E-10 | 2.5% | 3.28E-10 | 3.4% |
| 0.2 | 3.66E-10 | 3.2% | 3.84E-10 | 2.8% | 4.07E-10 | 4.0% | 3.77E-10 | 3.8% |
| 0.5 | 3.89E-10 | 2.8% | 4.15E-10 | 2.3% | 4.68E-10 | 2.9% | 4.53E-10 | 4.0% |
| 1.0 | 3.99E-10 | 3.6% | 4.18E-10 | 2.3% | 5.09E-10 | 3.7% | 5.06E-10 | 3.5% |
| 2.0 | 4.07E-10 | 3.5% | 4.46E-10 | 3.4% | 5.82E-10 | 3.8% | 5.51E-10 | 4.2% |
| 5.0 | 4.16E-10 | 3.5% | 4.68E-10 | 2.4% | 6.34E-10 | 4.0% | 6.48E-10 | 3.7% |
| 10.0 | 4.30E-10 | 2.7% | 4.91E-10 | 3.0% | 7.21E-10 | 3.5% | 7.39E-10 | 3.5% |
| 50.0 | 4.57E-10 | 2.1% | 5.37E-10 | 1.0% | 8.74E-10 | 3.4% | 9.76E-10 | 3.2% |
| 100.0 | 4.57E-10 | 1.7% | 5.58E-10 | 1.0% | 8.66E-10 | 2.6% | 1.05E-09 | 2.2% |

FIG. 25

Table A1.1. Fluence-to-effective dose conversion coefficients (Sv.cm$^2$) as a function of photon incident energy for different geometrical conditions of irradiation of an anthropomorphic mathematical model[15,19].

| Photon energy (GeV) | AP | | PA | | LAT | | ISO | |
|---|---|---|---|---|---|---|---|---|
| 0.00005 | 3.68E-13 | 2.2% | 2.35E-13 | 3.7% | 1.23E-13 | 2.7% | 1.69E-13 | 4.2% |
| 0.0001 | 5.13E-13 | 1.3% | 4.00E-13 | 2.5% | 2.28E-13 | 2.1% | 2.75E-13 | 3.4% |
| 0.0005 | 2.48E-12 | 1.4% | 2.11E-12 | 2.1% | 1.44E-12 | 1.2% | 1.61E-12 | 3.2% |
| 0.001 | 4.47E-12 | 2.4% | 4.09E-12 | 2.7% | 2.95E-12 | 3.1% | 3.19E-12 | 4.5% |
| 0.0015 | 6.13E-12 | 2.0% | 5.54E-12 | 2.3% | 4.34E-12 | 1.7% | 4.69E-12 | 4.5% |
| 0.002 | 7.47E-12 | 1.7% | 6.92E-12 | 2.9% | 5.62E-12 | 1.8% | 5.97E-12 | 3.1% |
| 0.003 | 9.94E-12 | 2.1% | 9.28E-12 | 4.5% | 7.77E-12 | 1.7% | 8.11E-12 | 3.7% |
| 0.004 | 1.22E-11 | 3.2% | 1.13E-11 | 2.9% | 9.66E-12 | 2.1% | 1.03E-11 | 3.6% |
| 0.005 | 1.36E-11 | 2.0% | 1.32E-11 | 2.6% | 1.14E-11 | 2.7% | 1.18E-11 | 4.1% |
| 0.006 | 1.52E-11 | 2.8% | 1.50E-11 | 2.8% | 1.33E-11 | 2.0% | 1.37E-11 | 3.6% |
| 0.008 | 1.82E-11 | 3.0% | 1.83E-11 | 2.8% | 1.66E-11 | 2.7% | 1.66E-11 | 3.7% |
| 0.01 | 2.16E-11 | 2.8% | 2.23E-11 | 3.0% | 1.96E-11 | 2.7% | 2.00E-11 | 2.5% |
| 0.02 | 3.44E-11 | 3.5% | 3.66E-11 | 2.4% | 3.47E-11 | 2.9% | 3.483-11 | 4.3% |
| 0.03 | 4.54E-11 | 3.5% | 5.06E-11 | 3.2% | 4.80E-11 | 2.1% | 4.88E-11 | 4.0% |
| 0.04 | 5.22E-11 | 3.3% | 5.75E-11 | 2.4% | 6.21E-11 | 2.3% | 5.92E-11 | 3.9% |
| 0.05 | 5.55E-11 | 2.4% | 6.72E-11 | 2.3% | 7.37E-11 | 3.5% | 6.89E-11 | 3.8% |
| 0.1 | 7.06E-11 | 3.7% | 8.91E-11 | 3.1% | 1.19E-10 | 2.6% | 1.00E-10 | 4.3% |
| 0.2 | 8.16E-11 | 3.0% | 1.06E-10 | 4.1% | 1.51E-10 | 2.6% | 1.40E-10 | 3.2% |
| 0.5 | 9.37E-11 | 3.6% | 1.21E-10 | 3.3% | 1.90E-10 | 4.2% | 1.81E-10 | 4.1% |
| 1.0 | 1.03E-10 | 3.4% | 1.32E-10 | 2.8% | 2.14E-10 | 4.3% | 2.01E-10 | 3.5% |
| 2.0 | 1.05E-10 | 3.3% | 1.40E-10 | 3.4% | 2.43E-10 | 4.1% | 2.35E-10 | 3.2% |
| 5.0 | 1.07E-10 | 3.8% | 1.46E-10 | 2.8% | 2.69E-10 | 3.8% | 2.64E-10 | 3.7% |
| 10.0 | 1.10E-10 | 3.0% | 1.49E-10 | 2.9% | 2.81E-10 | 3.7% | 2.93E-10 | 3.9% |
| 50.0 | 1.17E-10 | 3.1% | 1.54E-10 | 1.7% | 3.18E-10 | 3.2% | 3.68E-10 | 2.5% |
| 100.0 | 1.19E-10 | 2.4% | 1.60E-10 | 2.0% | 3.31E-10 | 3.9% | 4.14E-10 | 3.5% |

ANALYSIS SYSTEM FOR AVIATION RADIATION DOSE

CROSS-REFERENCE TO RELATED THE APPLICATION

This application claims priority from Korean Patent Application No. 10-2016-0102425 filed on Aug. 11, 2016 in the Korean Intellectual Property Office, the disclosure of which is incorporated herein by reference.

TECHNICAL FIELD

The present invention relates to an analysis system for an aviation radiation dose, and more particularly to an analysis system for an aviation radiation dose, which produces a global cosmic radiation dose map in real time with inputs of sunspot number data and proton flux of 10 MeV from geostationary operational environmental satellite (GOES); calculates an effective radiation dose rate and a cumulated dose according to flight paths, time, etc. varied in real time based on the pre-written radiation dose global map; and estimates a radiation route dose for any given air routes.

BACKGROUND ART

As a conventional analysis model for a cosmic radiation dose, there are CARI-6/6M provided by Federal Aviation Administration (FAA), a NAIRAS model developed by National Aeronautics and Space Administration (NASA), etc. However, the CARI-6/6M does not reflect a solar proton event, and the NAIRAS model does not open a source code and data to the public.

PRIOR ART

Patent Document (Patent Document 1) Korean Patent No. 10-1066878 (2011.09.16)

DISCLOSURE

Technical Problem

Accordingly, the present invention is conceived to solve the foregoing problems, and an object of the present invention is to provide an analysis system for an aviation radiation dose, which produces a global cosmic radiation dose map in real time with inputs of sunspot number data from National Oceanic and Atmospheric Administration (NOAA) and proton flux of than 10 MeV from geostationary operational environmental satellite (GOES); calculates an effective radiation dose rate and a cumulated dose according to flight paths, time, etc. varied in real time based on the pre-written radiation dose global map; and estimates a radiation route dose for any given air routes.

Technical Solution

In accordance with one aspect of the present invention, there is a provided analysis system for an aviation radiation dose, including: a proton spectrum generator which calculates a galactic cosmic ray incident on the Earth's atmosphere and a proton spectrum corresponding to a solar proton event; a global radiation dose map producer which calculates particle transport based on the proton spectrum and produces a radiation dose map; a global radiation dose map converter which converts the radiation dose map based on a standard atmosphere model into a radiation dose map corresponding to current atmosphere conditions in real time; and a database in which data necessary for operations of the proton spectrum generator, the global radiation dose map producer and the global radiation dose map converter are previously calculated and stored.

Advantageous Effects

According to the present invention, an analysis system for an aviation radiation dose has effects on producing a global cosmic radiation dose map in real time with inputs of sunspot number data and proton flux of 10 MeV from geostationary operational environmental satellite (GOES); calculating an effective radiation dose rate and a cumulated dose according to flight paths, time, etc. varied in real time based on the pre-written radiation dose global map; and estimates a radiation route dose for any given air routes.

DESCRIPTION OF DRAWINGS

FIG. 23 is a table of showing proton fluence-to-effective dose conversion coefficients, FIG. 24 is a table of showing neutron fluence-to-effective dose conversion coefficients, FIG. 25 is a table of showing electron fluence-to-effective dose conversion coefficients, FIG. 26 is a table of showing photon fluence-to-effective dose conversion coefficients.

BEST MODE

Figure 1:
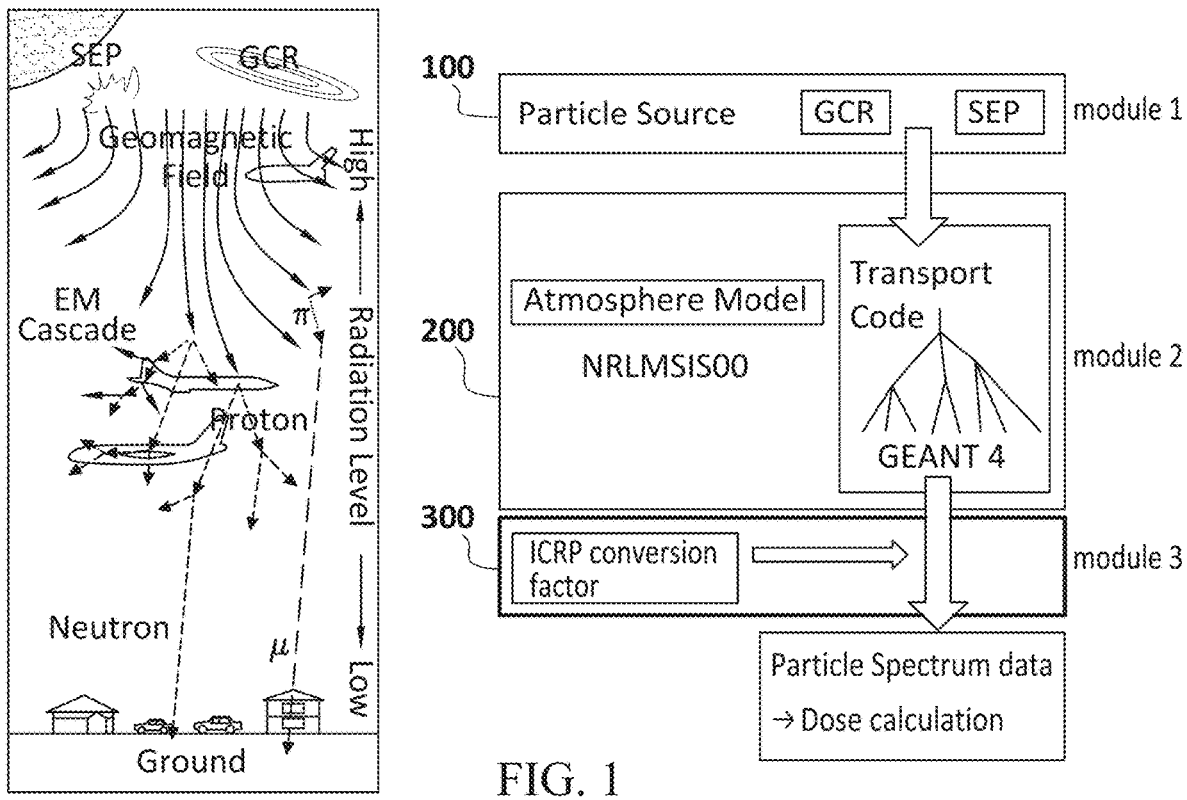
FIG. 1 is a block diagram of showing general concept of an analysis system for an aviation radiation dose according to the present invention.

Below, embodiments of the present invention will be described in detail with reference to accompanying drawings. In the following description, terms or words used in the specification and claims are construed as not typical or lexical meaning but meaning and concept corresponding to the idea of the present invention on the principle that the inventor can properly define the concept of the terms in order to explain his/her own invention for the best.

Therefore, it has to be understood that various equivalents and alternatives can be made at the time of filing the present invention since the descriptions of the specification and the features shown in the drawings are no other than preferred embodiments without reflecting all the technical ideas of the present invention.

Figure 2:
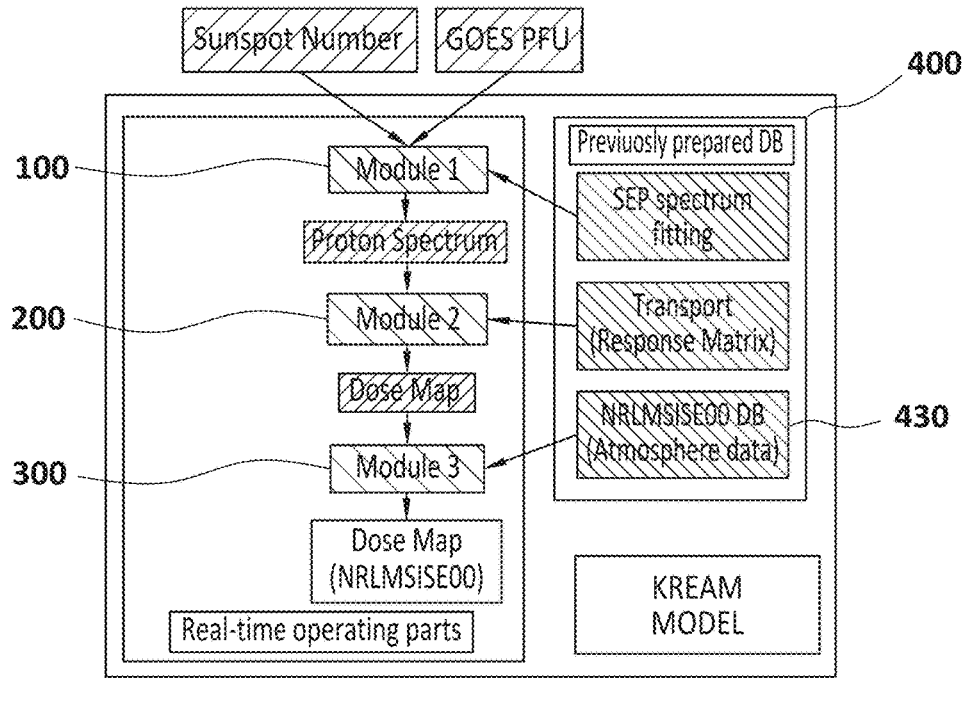
FIG. 2 is a detailed block diagram of the analysis system for the aviation radiation dose according to the present invention.

FIG. 1 is a block diagram of showing general concept of an analysis system for an aviation radiation dose according to the present invention, and FIG. 2 is a detailed block diagram of the analysis system for the aviation radiation dose according to the present invention.

As shown in FIG. 1 or FIG. 2, the analysis system for the aviation radiation dose according to the present invention includes a proton spectrum generator 100, a global radiation dose map producer 200, a global radiation dose map converter 300, and a database 400.

Figure 3:
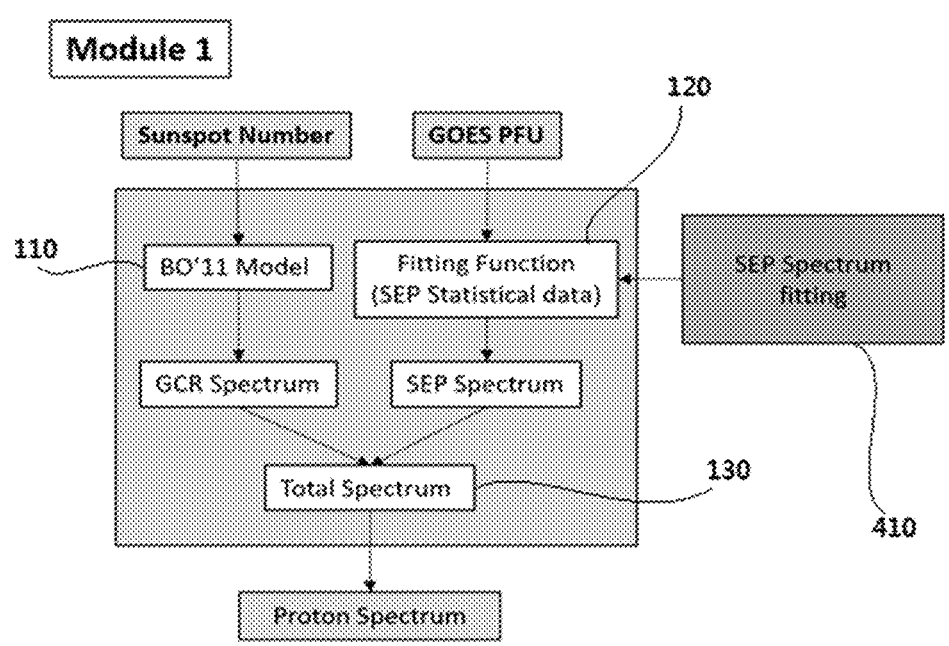
FIG. 3 is a detailed block diagram of a proton spectrum generator in the analysis system for the aviation radiation dose according to the present invention.

FIG. 3 is a detailed block diagram of the proton spectrum generator in the analysis system for the aviation radiation dose according to the present invention. As shown in FIG. 3, the proton spectrum generator 100 generates a proton spectrum in real time with an input of a sunspot number as external input data and an input of proton flux (GOES pfu<particle flux unit>) having high energy larger than 10 MeV observed in real time by the GOES staying on a geostationary orbit.

In more detail, a first spectrum generator 110 of the proton spectrum generator 100 applies the sunspot number to a Badhwar-O'Neill 2011 (BO'11) model, thereby generating a galactic cosmic ray spectrum.

That is, the proton spectrum generator 100 provides spectrums of heavy ions caused by galactic cosmic rays according to energy (from 10 to $10^7$ MeV) and the kinds of particles (from hydrogen to plutonium) on a geostationary orbit through the BO'11 model, in which fluence of particles of the galactic cosmic rays introduced into the solar system is calculated by the Fokker-Planck equation with respect to a constant local interstellar spectrum according to the particles at a heliosphere boundary (about 100 AU) and it is thus possible to generate a spectrum on the Earth's orbit.

By the way, the particles of the galactic cosmic ray introduced into the solar system are affected by the solar activity. When the solar activity is high, the injection of the particles into the heliosphere is relatively decreased by a strong magnetic field of the sun. On the other hand, when the solar activity is low, the injection of the particles is relatively increased by a weak magnetic field of the sun.

In the Badhwar-O'Neill 2011 model, a solar modulation parameter is used to estimate the strength of the solar activity. The solar modulation parameter is calculated by using the sunspot number. If a desired date is input to the Badhwar-O'Neill 2011 model, the solar modulation parameter is automatically calculated by using a monthly sunspot number stored in a program. Therefore, the analysis system for the aviation radiation dose according to the present invention (Korean radiation exposure assessment model (KREAM) for an aviation route dose) continuously calculates a monthly average sunspot number of a current time to determine a high-energy proton spectrum, and uses the obtained sunspot number to calculate the solar modulation parameter.

Figure 5:
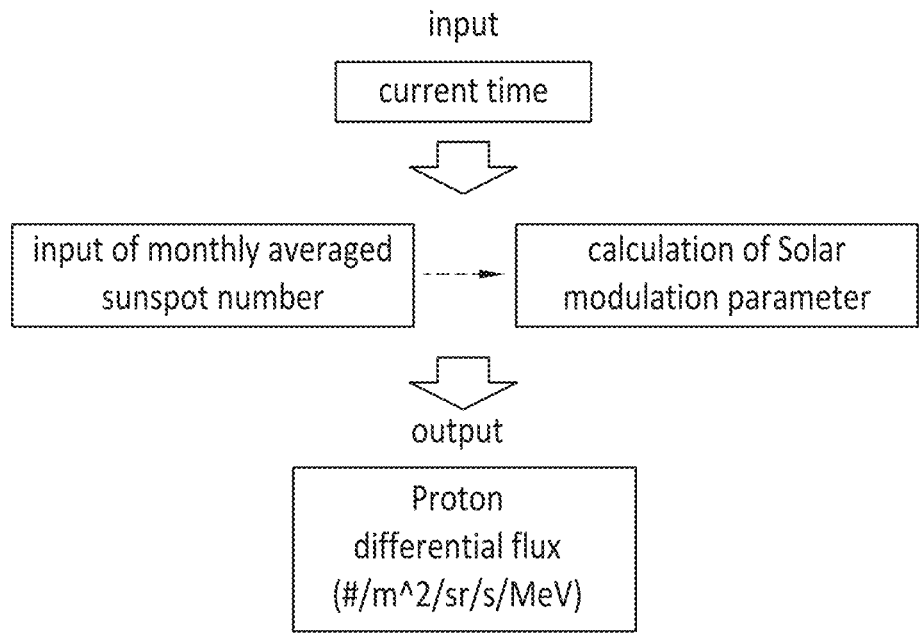
FIG. 5 is a block diagram of showing operations of Badhwar-O'Neill 2011 galactic cosmic ray model by a first spectrum generator in the analysis system for the aviation radiation dose according to the present invention.

The monthly averaged sunspot number is calculated by using a daily averaged sunspot number provided by the space weather prediction center (SWPC) of the National Oceanic and Atmospheric Administration (NOAA) in the United States Department of Commerce. As shown in FIG. 5, daily averaged sunspot numbers accumulated for 30 days from now are averaged and input to the Badhwar-O'Neill 2011 model, the model calculates a solar modulation parameter and thus calculates fluence on the Earth's orbit in accordance with the solar modulation parameter.

Figure 6:
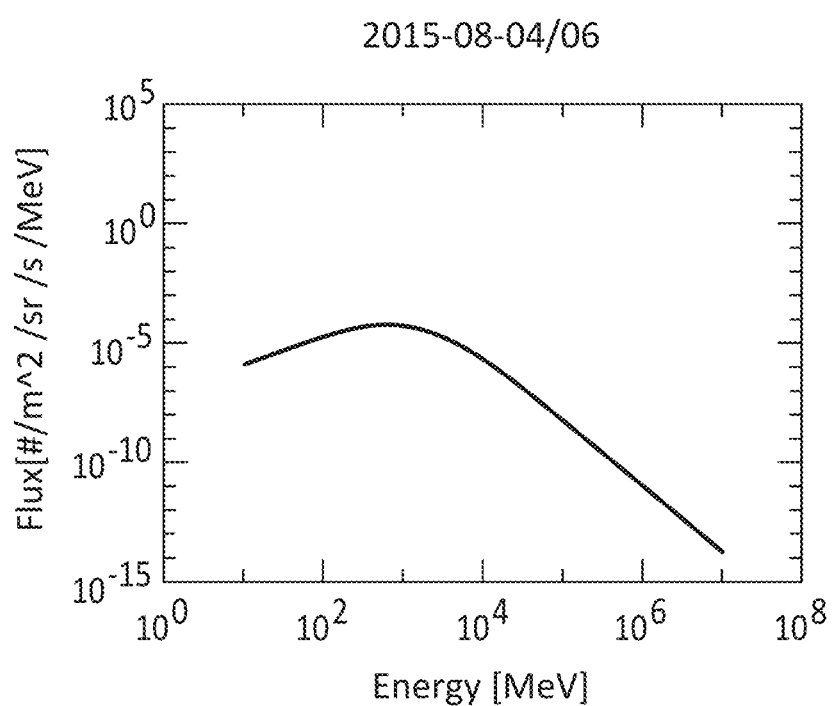
FIG. 6 is a view of showing an embodiment of a galactic cosmic ray spectrum generated by the first spectrum generator in the analysis system for the aviation radiation dose according to the present invention.

FIG. 6 shows proton flux on the Earth's orbit at six o'clock of universal time (UT) on 4 Aug. 2015, which is calculated by the Badwar-O'Neill 2011 model. The proton shows the maximum flux at energy of about 700 MeV, and the flux is decreased as the energy increases.

The galactic cosmic rays calculated in the Badwar-O'Neill 2011 model have a very broad energy range, but only extrasolar galactic cosmic rays will be taken into account. The analysis system for the aviation radiation dose according to the present invention employs the protons incident on the upper atmosphere (at a height of 80 km) as an input, which may be affected by not only the galactic cosmic rays but also various causes such as protons from the sun and protons accelerated within the magnetosphere.

It is hard to determine that the higher energy protons of which energy is larger than 700 MeV are accelerated within the magnetosphere or come from the sun. Since most protons are caused by the galactic cosmic ray, the analysis system for the aviation radiation dose according to the present invention employs the results of the Badwar-O'Neill 2011 model as an initial input value for the protons having higher energy than 700 MeV.

A second spectrum generator 120 of the proton spectrum generator 100 generates a solar proton spectrum based on the geostationary proton flux.

At this time, the second spectrum generator 120 uses a solar proton's energy spectrum fitting function stored in a function database (DB) 410 of the database 400 to thereby more quickly calculate the solar proton spectrum.

For the reference, the function DB 410 stores the solar proton spectrum fitting function based on the geostationary proton flux, obtained after statistically processing database from geostationary satellites' observations of the solar protons.

As described above, the galactic cosmic ray (GCR) has a relatively higher energy part in the proton input values of the analysis system for the cosmic radiation dose according to the present invention.

However, the model value of the galactic cosmic ray is calculated based on the periodic sunspot number, and therefore reflects periodic solar activity, but does not include a sudden explosion of the sun or temporal particle variations in the magnetosphere.

Accordingly, the analysis system for the aviation radiation dose according to the present invention needs a statistical prediction method based on an observed value with regard to the proton flux of which energy is less than 605 MeV, in order to reflect the sudden and temporal variation due to space weather such as coronal mass ejection or solar flare.

For the stable operations of the forecasting model, it is preferable to use a fitting method of differential flux of proton energy from several to hundreds MeV based on integrated proton-flux observation values of P>10 MeV at the satellite.

Using this idea, it becomes possible to estimate differential energy spectra if just one flux value of the energy channel of P>10 MeV is given. The reason why pfu of the 10 MeV proton flux is employed as a criterion is because an S scale, i.e. a solar radiation storm scale in space weather which is defined by National Oceanic and Atmospheric Administration Space Weather Prediction Center (NOAA/SWPC) is determined by pfu value of the 10 MeV proton flux observed in the geostationary orbit.

Further, the value of 10 MeV observed by the NOAA Geostationary Operating Environmental Satellite (GOES) satellite to determine the S scale as one of forecasting parameters for the space weather is always given by the NOAA, and therefore a proton flux channel value larger than 10 MeV was used as an input criterion for stable operation of the analysis system of the aviation radiation dose for the airlines. The NOAA has observed a proton' energy distribution on a geostationary orbit by continuously operating the GOES satellite series.

According to the present invention, as shown in the following [Table 1], data from a total of nine energy channels, i.e. six channels for P>10 MeV integrated protons of the energetic proton, electron and alpha detector (EPEAD, an instrument of GOES) flux and differential proton flux of the EPEAD, and three channels for differential proton flux of the high energy proton and alpha detector (HEPAD, an instrument of GOES) was used.

TABLE 1

| Duration | Satellite | Detector | Proton energy [MeV] | Criterion |
|---|---|---|---|---|
| 2000 Jan. 1~ 2015 May 31 | GOES-10, 11 | EPS | 2.5, 6.5, 11.6, 30.6, 63.1, 165 | P > 10 MeV flux |
| | | HEPAD | 375, 465, 605 | |
| | GOES-13 | EPEAD | 2.5, 6.5, 11.6, 30.6, 63.1, 165 | |
| | | HEPAD | 375, 465, 605 | |

Figure 7:
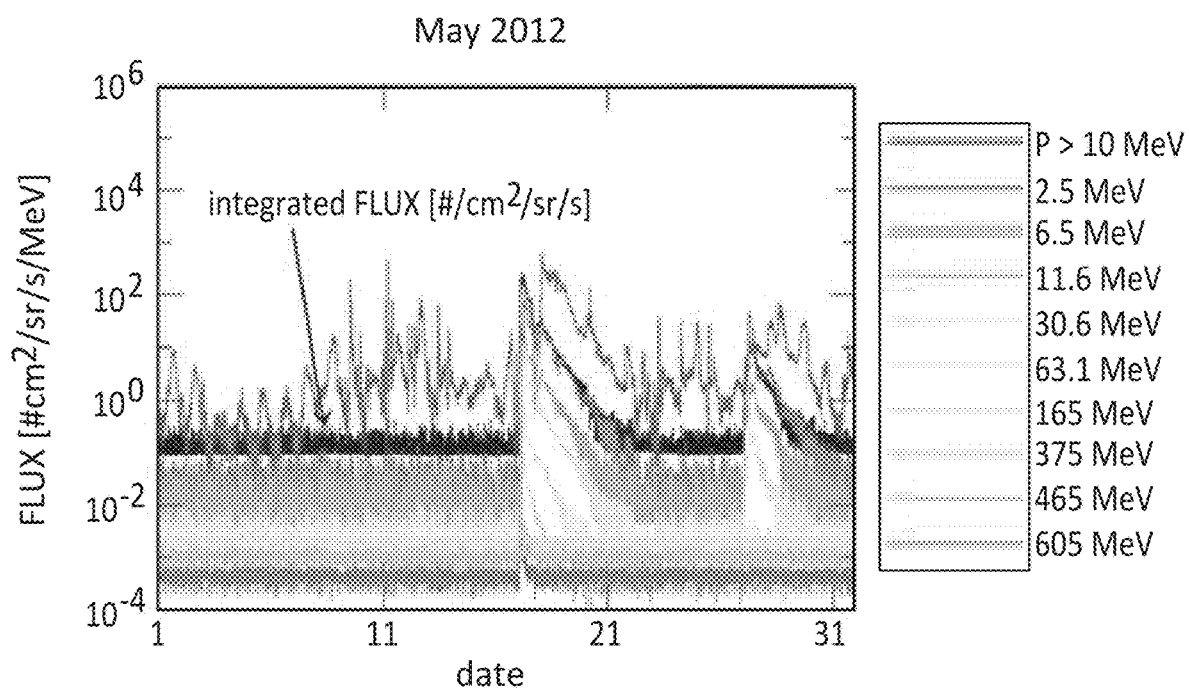
FIG. 7 is a view of showing variation in a proton flux of the whole energy channels observed by GOES for the month of May 2012.

Referring to FIG. 7 showing variation in the proton flux observed by GOES for the month of May 2012, a solar proton event (SPE) occurred with a solar flare on May 17.

When this event occurs, the integrated flux of the protons larger than 10 MeV shows a trend in the differential flux at each energy channel of the protons.

According to the present invention, it is preferable to obtain the differential flux of the protons by $2^{nd}$ order polynomial fit based on the integrated flux of the protons larger than 10 MeV in order to obtain an input value for protons less than 700 MeV.

From January 2000 to May 2015, the fitting was performed using data of GOES satellite series of 10, 11 and 13. Total 59 flux levels of P>10 MeV integrated flux were selected at regular intervals from $5\times10^{-2}$ to $2\times10^4$, and differential flux of 9 energy channels given in GOES with regard to every level of the integrated flux was selected.

Figure 8:
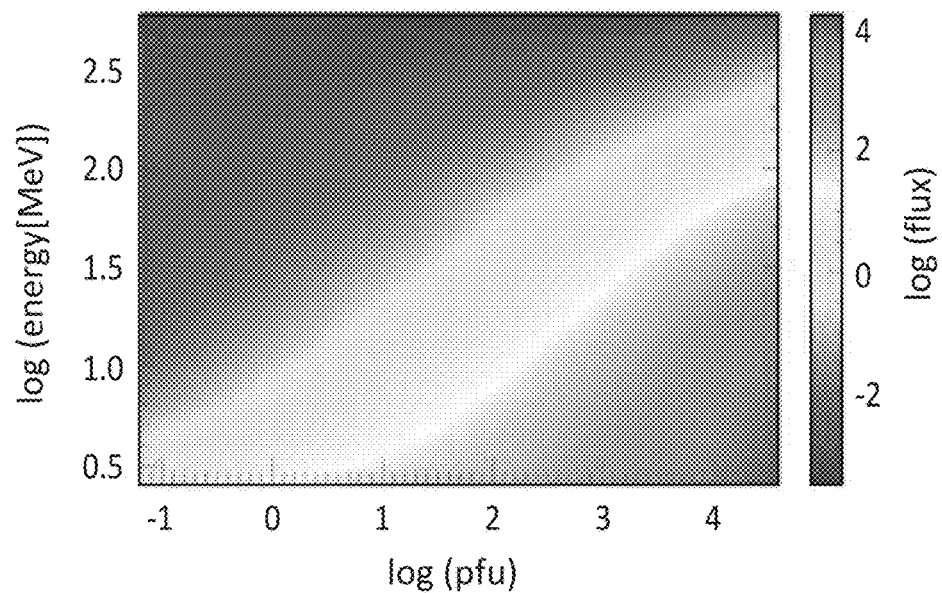
FIG. 8 is a view of showing a fitting result of a differential flux of the whole proton energy channels not lower than 10 MeV from 2000 to 2015.

FIG. 8 shows a final overplotted result for all energy ranges. Referring to FIG. 8, the differential flux increases with regard to all the energy channels of the protons as energy channel of P>10 MeV flux becomes higher.

Among the protons used as the input for the analysis system for the aviation radiation dose according to the present invention, the protons less than 700 MeV are calculated from parameters in a matrix of 59×9 made by the results of the foregoing fitting.

Figure 9:
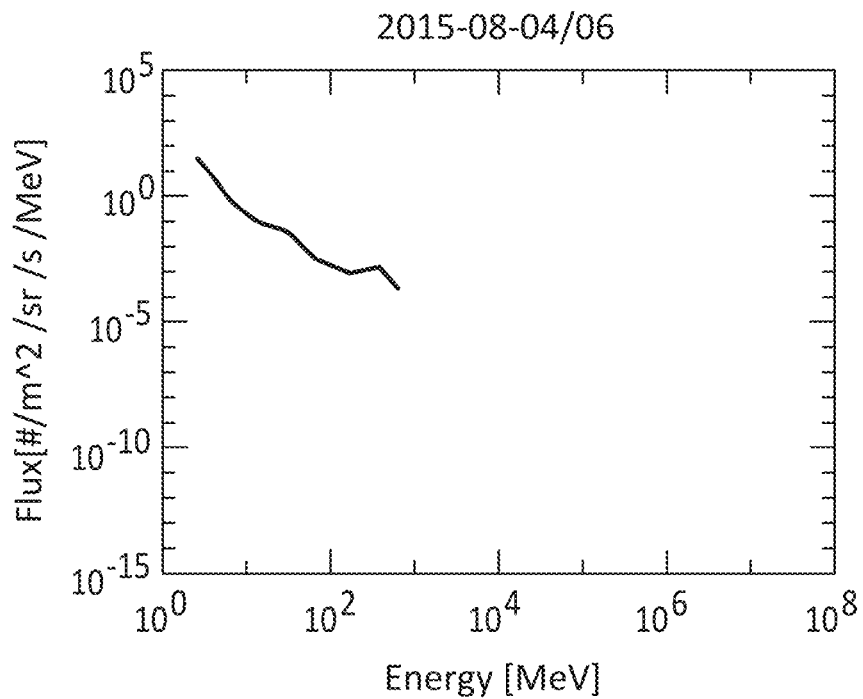
FIG. 9 is a graph of showing a spectrum of protons having energy not higher than 700 MeV during a specific period of time.

If the currently observed value of P>10 MeV belongs to 59 values, linear interpolation is used to calculate the flux according to the respective energy channels. FIG. 9 shows a result of confirming such a calculated SEP spectrum with regard to six o'clock on 4 Aug. 2015 at which the galactic cosmic ray was calculated through the Badhwar-O'Neill 2011 model.

Referring to FIG. 9, the higher the energy, the less the flux in general. Since actually observed proton values were used, it seems more complex than the proton values obtained from the model.

Below, a method of calculating the number of protons is used as the input for the analysis system for the aviation radiation dose according to the present invention by combining two proton spectra obtained as above (i.e. the solar proton fitting result of using the observed values and the galactic cosmic ray calculated through the Badhwar-O'Neill 2011 model), and input varied according to geographic locations through the geomagnetic cutoff rigidity.

As described above, the first spectrum generator 110 calculates the galactic cosmic ray spectrum through the Badhwar-O'Neill 2011 model, and the second spectrum generator 120 calculates the proton spectrum less than 700 MeV through the observed values of the protons on the geostationary orbit.

Then, a spectrum merger 130 of the proton spectrum generator 100 merges the galactic cosmic ray spectrum generated by the first spectrum generator 110 with the solar proton spectrum generated by the second spectrum generator 120, thereby generating a full proton spectrum.

To use the protons of the two different energy bands as the input of the analysis system for the aviation radiation dose according to the present invention, two additional processes are needed as follows.

First, the solar proton flux of 2.5~605 MeV and the galactic cosmic ray flux of 10~$10^7$ MeV are connected (merged) into one.

Since the Badhwar-O'Neill 2011 model provides the flux of the galactic cosmic ray in a very broad energy range, the flux of the galactic cosmic ray has overlapped parts with the energy band of the solar protons obtained by fitting from the observations.

In the data used in the present invention, the solar proton and the galactic cosmic ray were overlapped in a band of 10~605 MeV. Since the solar proton is generated based on the observation, it includes the galactic cosmic ray as well as the protons coming from the sun.

Therefore, the spectrum merger 130 removes the results of the galactic cosmic ray in a band less than 605 MeV covered by the solar proton spectrum, and merges the solar proton spectrum with the galactic cosmic ray spectrum based on the results of the galactic cosmic ray by the Badhwar-O'Neill 2011 model from the flux larger than 700 MeV.

In result, the spectrum merger 130 obtains the proton spectrum in a broad energy range from 2.5 MeV to $10^7$ MeV.

Figure 10:
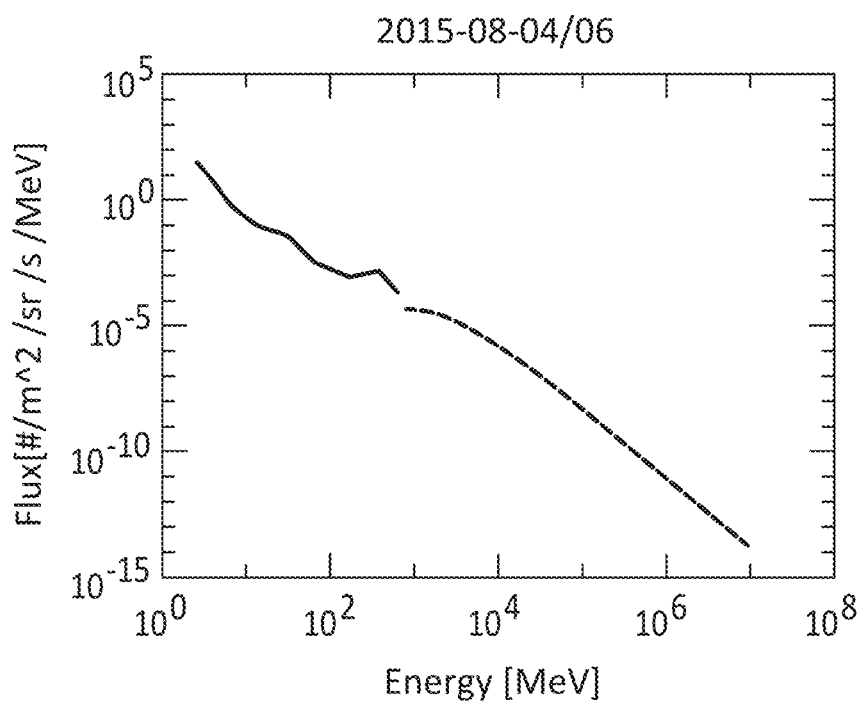
FIG. 10 is a graph of showing combination of a solar proton spectrum and a galactic cosmic ray spectrum.

FIG. 10 shows an example of merging the solar proton and the galactic cosmic ray flux at six o'clock on 4 Aug. 2015. Referring to FIG. 10, the solar proton and the flux of the galactic cosmic ray are relatively naturally connected. This means that the protons having hundreds of MeV are mostly generated from the galactic cosmic ray.

Since a space environment is quiet for the selected period in FIG. 10, there is no sudden increase of the protons having hundreds of MeV as shown in FIG. 7.

The galactic cosmic ray is known to be irrelevant to temporary and sudden change in solar activity such as an explosion of sunspots. Therefore, if the space weather has a sudden change such as a solar flare caused by a solar burst, a coronal mass ejection (CME), etc. within a relatively short period of time, it might cause large difference in a fitting result of the solar protons, but cause little difference in the galactic cosmic ray model.

Such a phenomenon that the sudden change in the space weather has large effect on the fitting result of the solar proton but little effect on the galactic cosmic ray model may cause large difference between the flux of the energy range of the protons of 605 MeV and 700 MeV.

Accordingly, to make a flux distribution similar to a spectrum of actual protons, there is a need to make a fitting functional form between the solar proton and the galactic cosmic ray.

According to the present invention, a fit function was selected in the form of $3^{rd}$ order polynomial to make a smooth fitting between the solar proton and the flux of the galactic cosmic ray. Since a solar proton flux value and a galactic cosmic ray flux value are continuously varied every hour, a function for fitting of combining the two values is also continuously changed. The following equation is the fit function of one example that we found for the solar proton and the galactic cosmic ray at six o'clock on 4 Aug. 2015.

$$\text{flux} = 10^{1.406(log_{10}E)^0 - 1.768(log_{10}E)^1 + 0.048(log_{10}E)^2 + 0.016(log_{10}E)^3}$$

Figure 11:
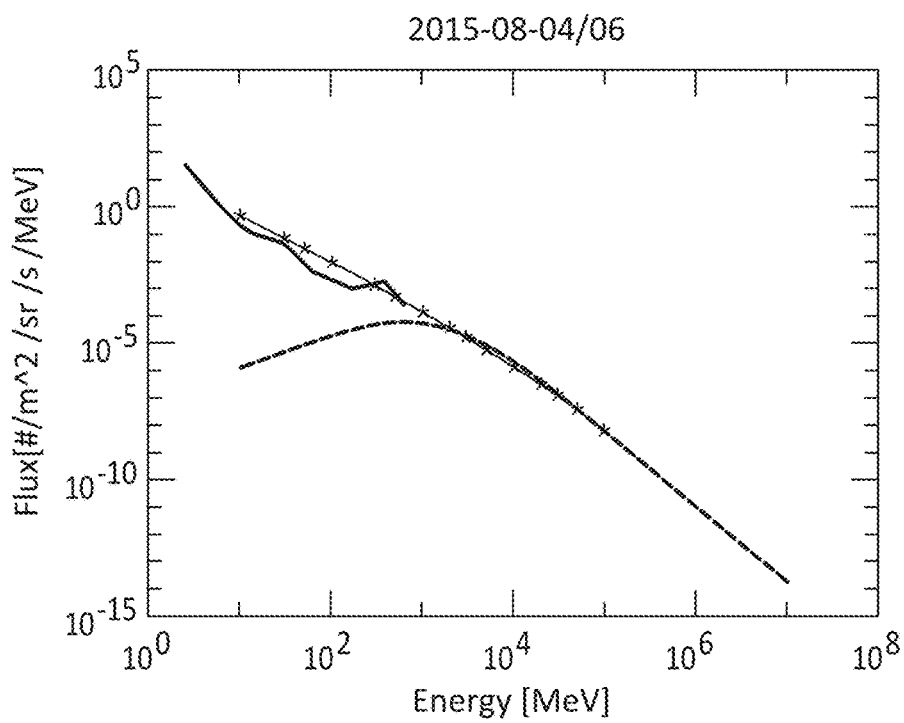
FIG. 11 is a view of showing the combination of the solar proton spectrum and the galactic cosmic ray spectrum on a certain day and an example of fitting function combining the solar proton and the galactic cosmic ray.

[Equation 1]

where, E is an energy channel. This equation provides a proton flux value at a desired energy channel FIG. 11 shows the solar proton and the galactic cosmic ray at six o'clock on 4 Aug. 2015, and a fitting result between the solar proton and the galactic cosmic ray.

It will be understood that both the solar proton and the galactic cosmic ray are reflected in the fit function for the proton energy ranges from 10 to $10^5$ MeV.

In the analysis system for the aviation radiation dose according to the present invention, the number of particles in the uppermost layer of the atmosphere (at a height of 80 km) according to energy of the protons is employed as the input, and therefore there is a need of converting the flux of the proton into the number of particles.

According to the present invention, the flux was integrated with the assumption that the particles have an isotropic distribution. Since the flux is given in units of (the number of particles/$m^2$/sr/s/MeV), it is possible to convert the flux into the number of particles/s by integrating the flux over area, azimuthal angle and energy range.

The number of particles obtained from the integral calculation and the energy channel are globally the same and are used as an input to the analysis system for the aviation radiation dose according to the present invention. In other words, the same number of particles is ready to enter the uppermost layer of the atmosphere (at the height of 80 km) regardless of latitude and longitude on the currently described premise.

The global radiation dose map producer 200 receives the proton spectrum generated by the proton spectrum generator 100 and produces a global radiation dose map.

Figure 4:
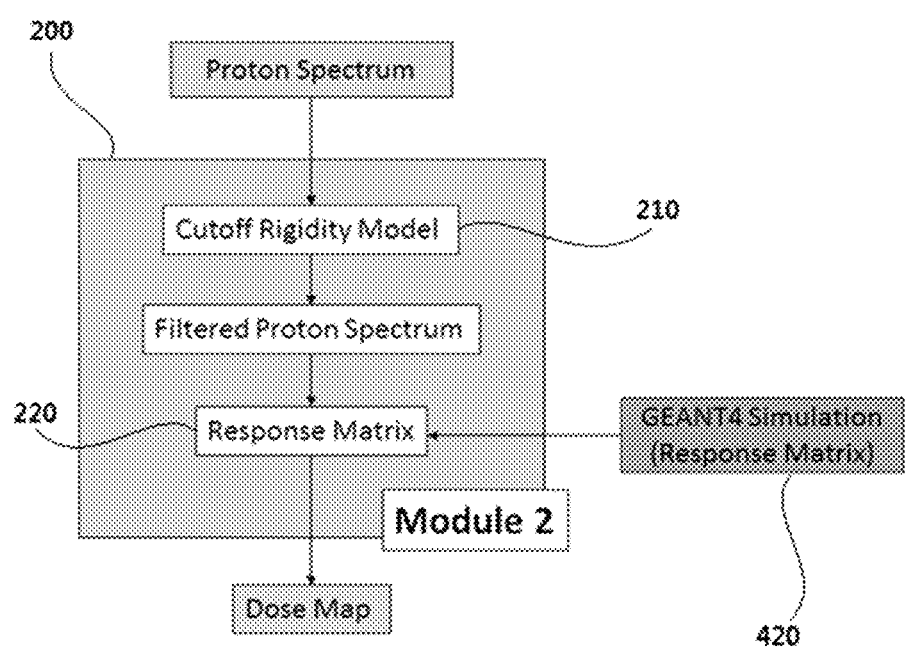
FIG. 4 is a detailed block diagram of a global radiation dose map producer in the analysis system for the aviation radiation dose according to the present invention.

FIG. 4 is a detailed block diagram of a global radiation dose map producer in the analysis system for the aviation radiation dose according to the present invention. With reference to FIG. 4, it will be described in more detail that the global radiation dose map producer 200 produces global radiation dose map.

First, the global radiation dose map producer 200 includes a proton filter 210 and a global radiation dose map producer 220.

The proton filter 210 converts the proton spectrum received from the proton spectrum generator 100 into the spectrum of the height of 80 km through the cutoff rigidity model, and removes the specific energy's protons that do not reach the height of 80 km.

The cutoff rigidity model uses a static geomagnetic model, i.e. an international geomagnetic reference field (IGRF) model, and removes the protons that do not reach the height of 80 km by a magnetic field.

Below, the cutoff rigidity model will be described in more detail.

Charged particles on the Earth's orbit begin to enter into the Earth's magnetosphere through the Earth's magnetic field. At this time, a magnetic shield is made in between different energy levels according to incident locations by the magnetic field.

According to the present invention, the foregoing cutoff rigidity model is used to apply such a magnetic shielding phenomenon of the charged particles. From results of the cutoff rigidity model, it will be appreciated that particles having different energy levels are different in a traveling path even though the same kind of particles are located in the same latitude, longitude and altitude.

The traveling path of the particles is calculated by applying the following Lorentz equation of motion in a given magnetic field.

$$\vec{a} = \frac{q}{m_i}\vec{v} \times \vec{B} \quad \text{[Equation 2]}$$

In [Equation 2], $\vec{a}$ is an acceleration, q is the quantity of electric charge on a particle, $m_i$ is the mass of ion, $\vec{v}$ is a velocity of a particle, and $\vec{B}$ is a given magnetic field. This equation is calculated by the Runge-Kutta algorithm within cutoff rigidity codes.

If a program is executed after a start latitude and start longitude of a particle are set in an input card and a start height is set in the program by setting rigidity (energy), the latitude and longitude where particles are converged according to rigidity are respectively output as ALat and ALon. If this value is marked with RFH, it means that the particle cannot escape from the Earth.

Accordingly, the rigidity of particles that cannot escape from the Earth may be set discontinuously. To select specific rigidity that makes the particle cannot escape from the Earth at the corresponding location; there is a need of introducing concept of effective cutoff rigidity ($R_C$).

The effective cutoff rigidity is a single value that can effectively represent the discontinuous rigidity, and defined by the following [Equation 3].

$$R_C = R_u - \sum_{R_L}^{R_i} \Delta R_i(\text{allowed}) \quad \text{[Equation 3]}$$

In [Equation 3], $R_u$ is the highest rigidity value at which no particles can escape from the Earth, $R_L$ is the lowest rigidity value, and $\Delta R_i$ is a range of continuous rigidity.

If the foregoing rigidity calculations are applied to global latitudes and longitudes, it is possible to obtain effective cutoff rigidity values depending on the latitudes and longitudes.

Figure 12:
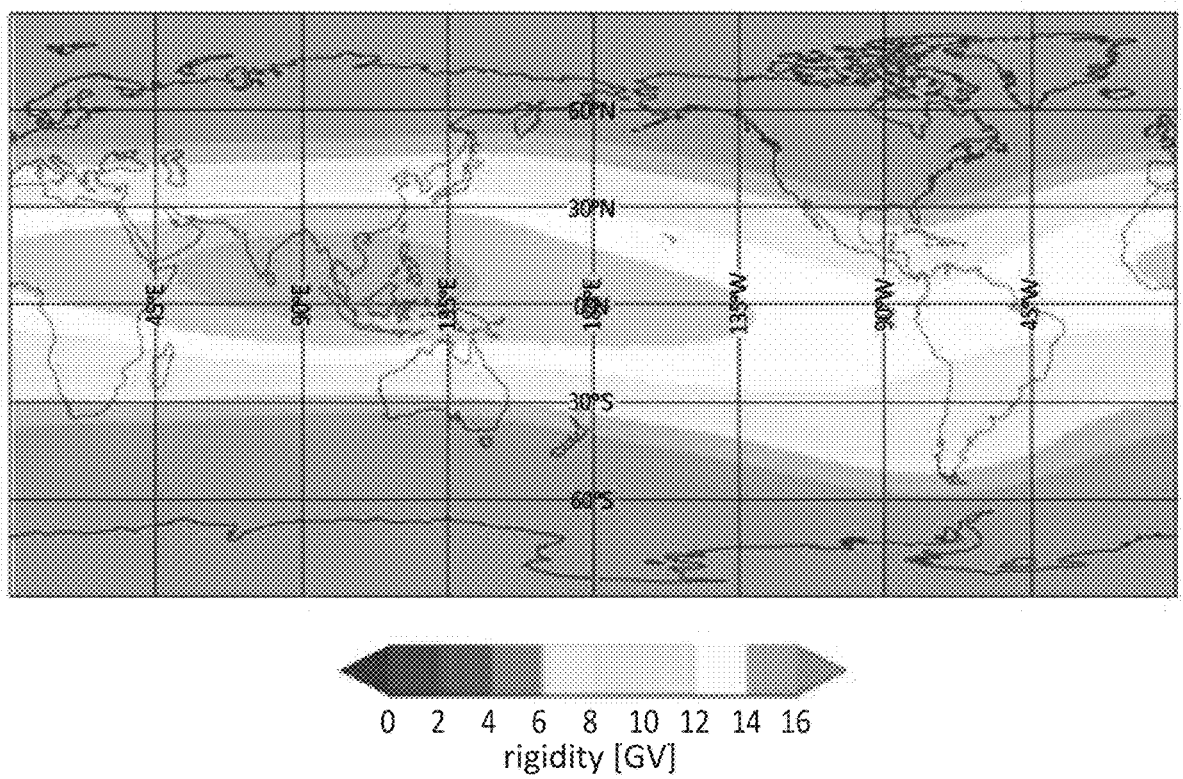
FIG. 12 is a view of showing a distribution of an effective cutoff rigidity calculated at intervals of 1 degree of latitude and 1 degree of longitude throughout the globe.

FIG. 12 is a view of showing a distribution of the effective cutoff rigidity calculated at intervals of 1 degree of latitude and 1 degree of longitude throughout the globe. Referring to FIG. 12, the rigidity increases up to 18 GV toward the equator and approximates to 0 GV toward the polar regions. Regarding the longitude, the rigidity is relatively weak in the continent of Americas, but relatively strong in the continent of Asia.

This means only particles having very high energy can reach the height of 80 km because the cutoff rigidity of particles increases toward the equator in Asia. In other words, a particle having relatively low energy is allowed to reach the height of 80 km in high latitudes, but only a particle having very high energy is allowed to reach the height of 80 km in low latitudes.

The cutoff rigidity is converted into cutoff energy by the following equation.

$$E_k = \left( \sqrt{\left(\frac{R_C n_z}{(P_{amu}/n_a)EP_{amu}n_a}\right)^2 + 1.0} - 1.0 \right) EP_{amu} \frac{P_{amu}}{n_a} \quad \text{[Equation 4]}$$

In [Equation 4], $n_z$ is the quantity of electric charge on a particle, $n_a$ is an atomic number of the particle, $P_{amu}$ is an atomic mass unit, $EP_{amu}$=931.131 MeV/amu is a mass energy per atomic mass unit.

Figure 13:
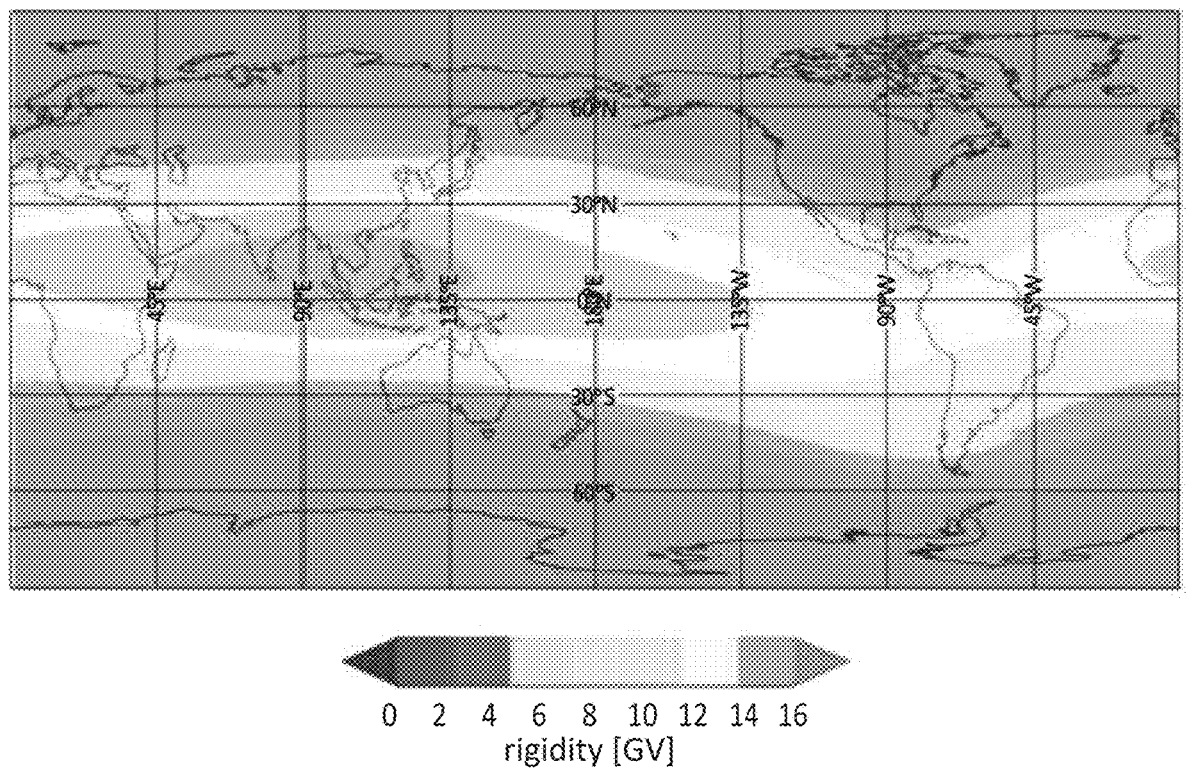
FIG. 13 is a view of showing a distribution of an effective energy of protons passed through the cutoff rigidity throughout the globe.

FIG. 13 is a view of showing the effective energy converted from the effective cutoff rigidity of FIG. 12 by [Equation 4] throughout the globe. As shown in FIG. 13, it will be appreciated that there are little difference in distribution between the effective energy and the effective rigidity.

Since the analysis system for the aviation radiation dose according to the present invention employs the static magnetic-field model, i.e. the IGRF model, the cutoff rigidity and the cutoff energy map are always static as shown in FIG. 12 and FIG. 13.

It is possible to obtain a variable value by employing the magnetic field varied in real time, but this is not necessary in light of the present invention that requires quick calculations and predictions.

The input value for the analysis system for the aviation radiation dose according to the present invention is the number of protons distributed according to energy levels, and this value is equally set throughout the globe since the proton spectrum is a value with respect to the Earth's orbit.

When particles enter into the height of 80 km, the energy shielded against the magnetic field is given to be not higher than the cutoff rigidity.

Figure 14:
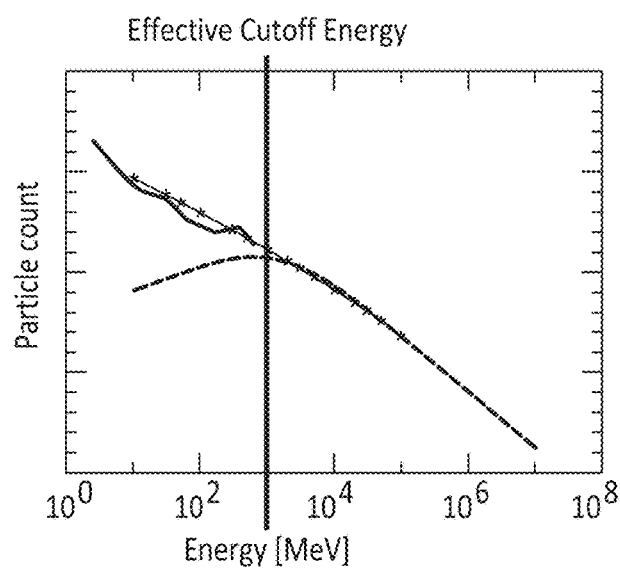
FIG. 14 is a view of showing an example of the cutoff energy applied at a certain latitude and longitude.

Therefore, as shown in FIG. 14, values less than the cutoff energy are removed from the proton spectrum on the Earth's orbit, different proton spectrums are applied depending on different latitudes and longitudes.

The global radiation dose map producer 220 produces a global radiation dose map at the US standard atmosphere from the proton spectrum filtered by the proton filter 210.

To produce the global radiation dose map at the standard atmosphere, the global radiation dose map producer 220 operates the response matrix stored in a response matrix DB 420 of the database 400 and the proton spectrum (i.e. the input value).

For reference, the response matrix DB 420 stores a response-matrix operation formula for a result of GEANT4 particle transport simulation that is a very time-consuming calculation even for just one calculation for one incident proton.

In more detail, transport of neutrons, electrons and photons as well as protons from the height of 80 km to the surface of the Earth has to be traced and calculated one by one to obtain a cosmic radiation dose at a flight height. A method of achieving this is roughly divided into a probabilistic method and a deterministic method. The probabilistic method obtains a relatively highly accurate calculation result, but physically requires a very long calculation time. On the other hand, the deterministic method completes calculations within a very short time, but is relatively inaccurate.

To solve this problem, a pre-calculating method using the response matrix was taken into account in present invention. According to this method, the particle transport from the height of 80 km to the surface of the Earth is calculated in advance by the probabilistic method, the response matrix where the results are arranged is previously made, and only the response matrix is used in the calculation when the system is operated in real time.

Like this, the calculation is quickly performed in practical use since the time-consuming calculation is completed in advance, and highly accurate results are obtained since the probabilistic method is used.

To make the response matrix, a Monte-Carlo type GEANT4 particle transport code for the atmosphere geometry and a nucleon simulation was used, and an atmospheric composition and a density information from the surface of the Earth to the height of 80 km based on the US standard atmosphere model were used as an atmosphere model where a particle transports.

According to the present invention, a GEANT4 computer simulation is performed with regard to more various energy bands under an environment like an atmospheric environment, thereby establishing a more accurate and enhanced response matrix.

In consideration of the currently given available computational resources and schedules, representative energy levels of a proton incident at the height of 80 km were set to thirteen energy levels (5, 10, 50, 100, 500, 1000, 2000, 3000, 5000, 10000, 20000, 50000 and 100000 MeV).

Figure 18:
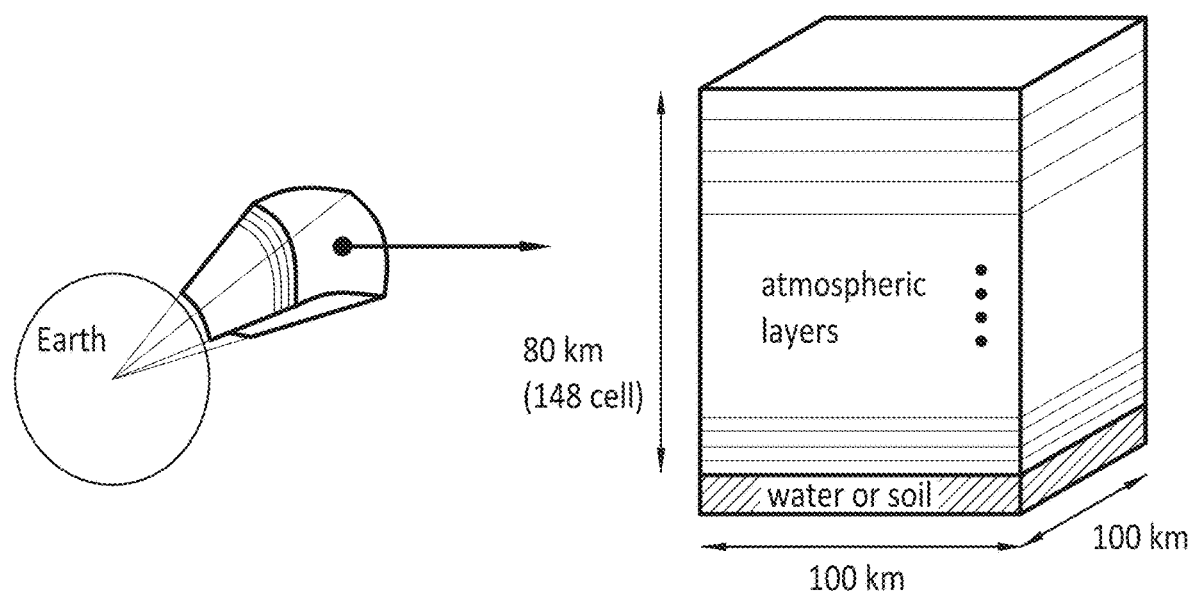
FIG. 18 is a view of GEANT4 (GEometry ANd Tracking4) simulation geometry simplified for producing a response matrix of global atmosphere according to solar proton injections.

As shown in FIG. 18 and described in Table 2, the geometry for the GEANT4 computer simulation was set to have the highest height of 80 km, arrange the thickness of the atmospheric layer from the surface of the Earth up to a dense layer for a flight height, and have a total of 148 atmospheric layers.

A space of 100 km in each of latitude and longitudes was taken into account for the GEANT4 simulation, and a radiation dose was calculated at intervals of 1° by 1° for a final product calculation. Information of each layer was cited from information corresponding to each height in the US standard atmosphere model, and water ($H_2O$) or the ground surface was selectable as the lowest layer so that accurate results can be obtained with respect to a north polar route.

TABLE 2

|  | Height | Thickness of layer |
|---|---|---|
| Thickness of atmospheric layer | 50~80 km | 2.5 km |
|  | 15~50 km | 1.0 km |
|  | 5~15 km | 0.2 km |
|  | 0~5 km | 0.1 km |
| Atmosphere information | US standard atmosphere | |

Figure 15:
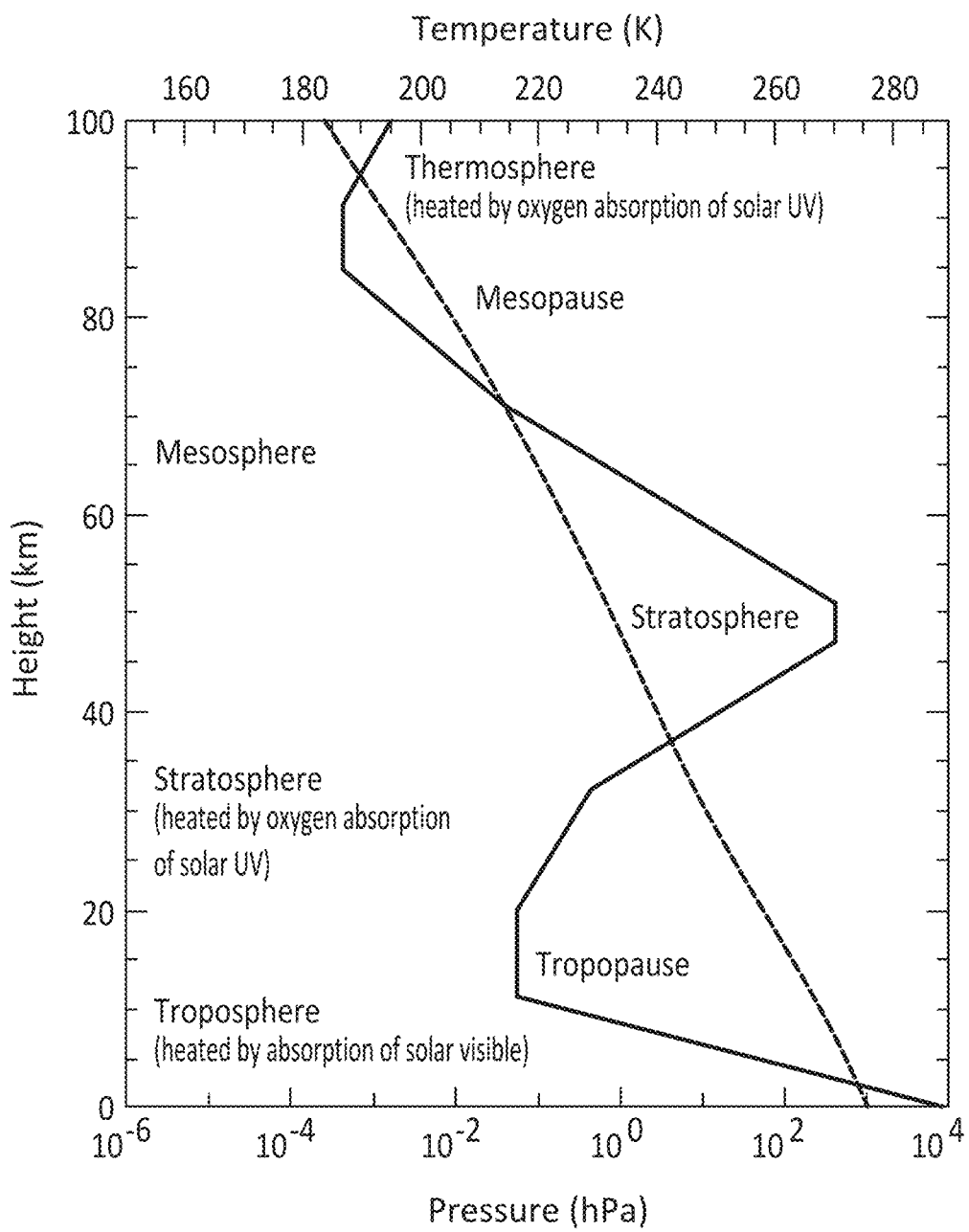
FIG. 15 is a view of showing the static US standard atmosphere model (1976)

As shown in FIG. 15, the US standard atmosphere model shows an atmospheric pressure that has a value of 1013 hPa on the surface of the Earth and gradually decreases up to the height of 80 km.

The global radiation dose map produced by the response matrix of the global radiation dose map producer 220 is varied depending on atmospheric conditions used when making the response matrix.

However, the US standard atmosphere model has some known problems that atmospheric change according to latitudes and longitudes on the Earth is not reflected, and seasonal change is also not applied.

To solve the foregoing problems and make the global radiation dose map produced under the standard atmosphere be varied depending on the current atmospheric conditions, the global radiation dose map producer 200 sends the global radiation dose map to the global radiation dose map converter 300.

Since the global radiation dose is calculated based on the static US standard atmosphere in the global radiation dose map producer 200, the global radiation dose map converter 300 dynamically changes the global radiation dose in accordance with real-time atmospheric conditions, and thus obtains a radiation dose map suitable for the current atmospheric conditions.

The global radiation dose map converter 300 converts the global radiation dose map suitable for the standard atmosphere into a global radiation dose map suitable for the current atmospheric conditions based on a piece of information corresponding to the current time among pieces of the atmospheric information stored in a current atmospheric information DB 430 of the database 400.

At this time, the global radiation dose map converter 300 makes conversion between the current atmosphere and the US standard atmosphere with respect to pressure.

For reference, the current atmospheric information is based on the NRLMSISE-00 model developed by the US Naval Research Laboratory, and the current atmospheric information DB 430 stores results of performing a simulation in advance in order to shorten time to be taken in calculation of the NRLMSISE-00 model.

Each operation time of the proton spectrum generator 100, the global radiation dose map producer 200 and global radiation dose map converter 300 is longer than data calculation time, and it is thus impossible to actually calculate data in real time. Therefore, the database 400 is built by selecting previously calculable parts and performing calculations in advance with regard to the selected parts.

In more detail, a US naval research laboratory mass spectrometer and incoherent scatter radar with exosphere released in 2000 (NRLMSISE00) model was employed to reflect more realistic atmospheric conditions in the radiation dose map conversion of the foregoing map converter 300 according to the present invention.

The NRLMSISE00 model receives date and time, latitude, longitude, height, F10.7 and Ap indices as input values, and thus provides number density, total mass density and temperature of various neutral particles (He, O, $O_2$, N, $N_2$, Ar, and H) as output values.

Since the US standard atmosphere model provides pressure corresponding to height, the ideal gas equation (P=nkT) was used to obtain the pressure from the results of the NRLMSISE00 model.

Figure 16:
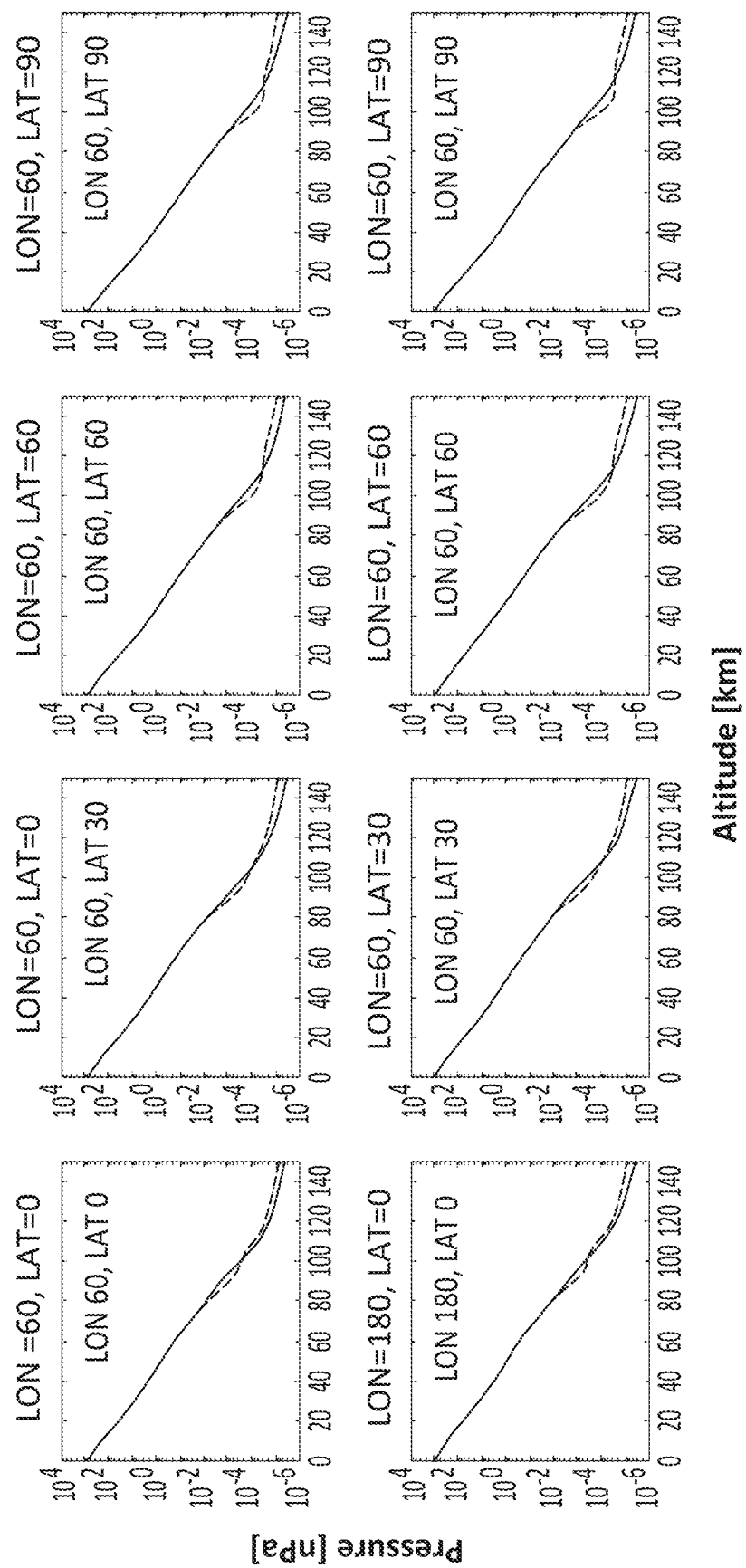
FIG. 16 is a view of showing a variation in pressure according to altitudes at certain latitudes and longitudes.

FIG. 16 shows variation in pressure according to heights at latitudes and longitudes as F10.7 and Ap indices are changed. Referring to FIG. 16, it will be understood that F10.7 and Ap indices have a large effect at only the height of 80 km or higher with regard to all latitudes and all longitudes.

In other words, the NRLMSISE00 model is free from F10.7 and Ap indices at the height not higher than 80 km.

If the response matrix is made from the height of 100 km, the analysis system for the aviation radiation dose according to the present invention has to operate the NRLMSISE00 model whenever executing the model to thereby reflect F10.7 and Ap indices in real time and calculate a pressure distribution of global atmosphere However, if the response matrix is made from the height of 80 km, it is possible to improve stability of the model and shorten the time of driving the model by building a DB of the NRLMSISE00 model.

Accordingly, the analysis system for the aviation radiation dose according to the present invention sets 80 km as the uppermost layer of the atmosphere, and thus builds a DB with a total of 8,784 files, one of which is made out per hour in the form of a matrix of 360×181×148 with respect to a total of 148 heights within 0~80 km, at intervals of 1° of latitude and 1° of longitude.

The method of applying the NRLMSISE00 model to the global radiation dose map produced based on the US standard atmosphere model is as follows.

First, global pressure is obtained after matching height intervals of the NRLMSISE00 at every latitude and longitude with those used in making the response matrix.

With respect to the pressure obtained from the results of the NRLMSISE00 model, the height of the US standard atmosphere at the corresponding pressure is obtained by linear interpolation.

In such a manner, the heights of the US standard atmosphere are obtained with regard to the pressure values of all the locations (latitude, longitude, height). If a height value is obtained as a negative number (around the surface of the Earth), it is changed into 0. If a new global radiation dose map is produced by putting the values of the radiation dose map in the atmospheric information of the NRLMSISE00 model made out with the height values while matching the heights, the global radiation dose map based on the NRLMSISE00 model is completed.

Figure 17:
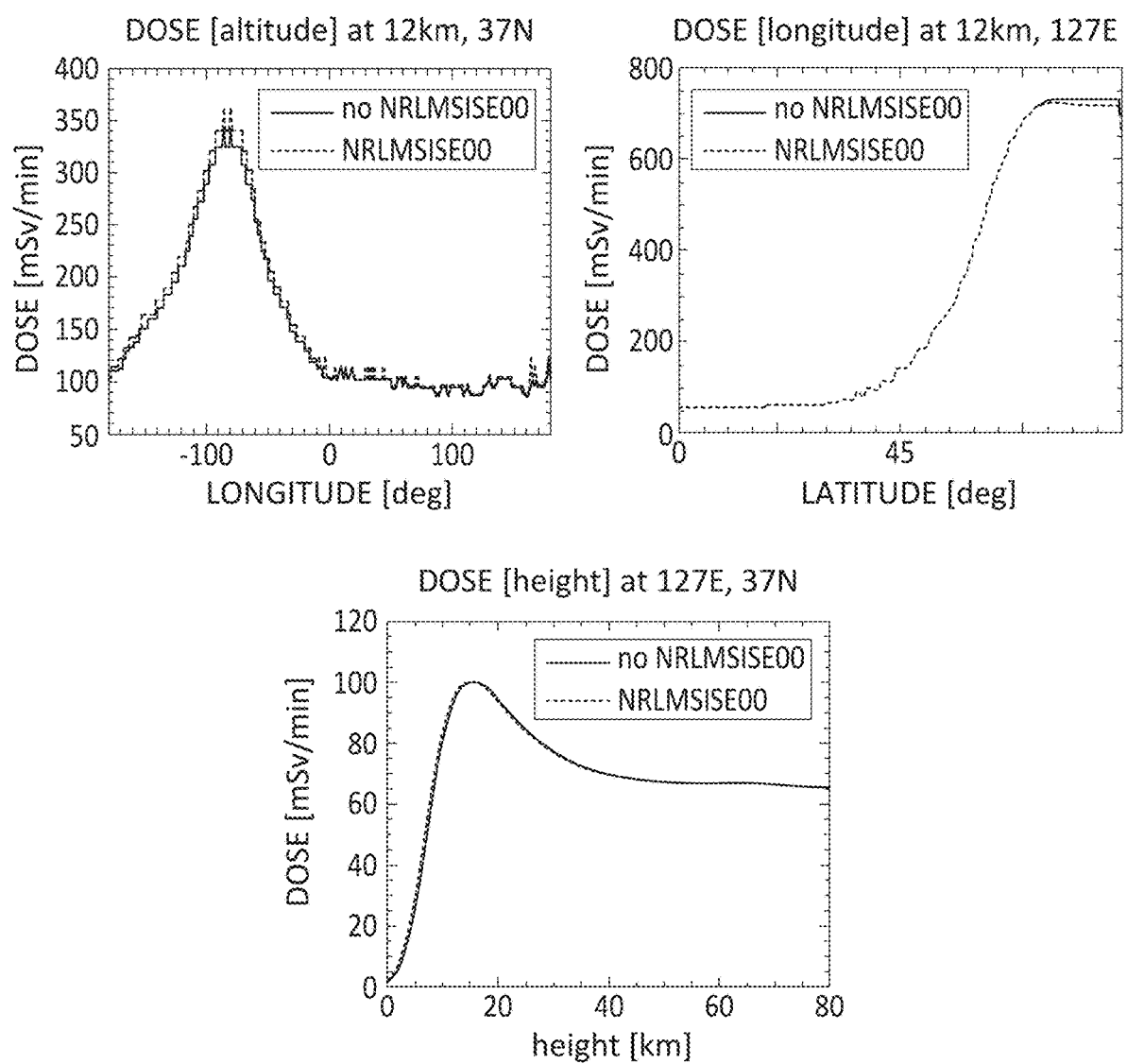
FIG. 17 is a graph of showing a radiation dose result (red) based on the static US standard atmosphere and a radiation dose (black) based on an NRLMSISE00 atmosphere model varied in real time according to longitudes, latitudes and altitudes.

FIG. 17 shows a difference between the global radiation dose map based on the US standard atmosphere and the global radiation dose map based on the NRLMSISE00 model according to longitudes, latitudes and altitudes. There is an average difference of about 7% between the global radiation dose map based on the US standard atmosphere and the global radiation dose map based on the NRLMSISE00 model. Although this is not a great difference, the radiation dose is a little decreased in regions where the latitude is high (equal to or higher than about 70 degree of latitude). This is because the radiation dose is not largely increased according to the latitude but the pressure calculated in the NRLMSISE00 atmosphere model is largely increased from the latitude larger than about 70 degree of latitude. Since a distance from the center of the Earth becomes shorter and the gravity becomes stronger toward the polar regions, the atmosphere is more strongly restrained by the Earth and thus increased in density. In other words, the pressure of the atmosphere increases as the latitude becomes higher, and the radiation dose also decreases since the corresponding height of the US standard atmosphere decreases.

Although the NRLMSISE00 model does not cause any remarkable distinction, it will be understood that accuracy is more quantitatively improved as compared with when using the US standard atmosphere.

Figure 19:
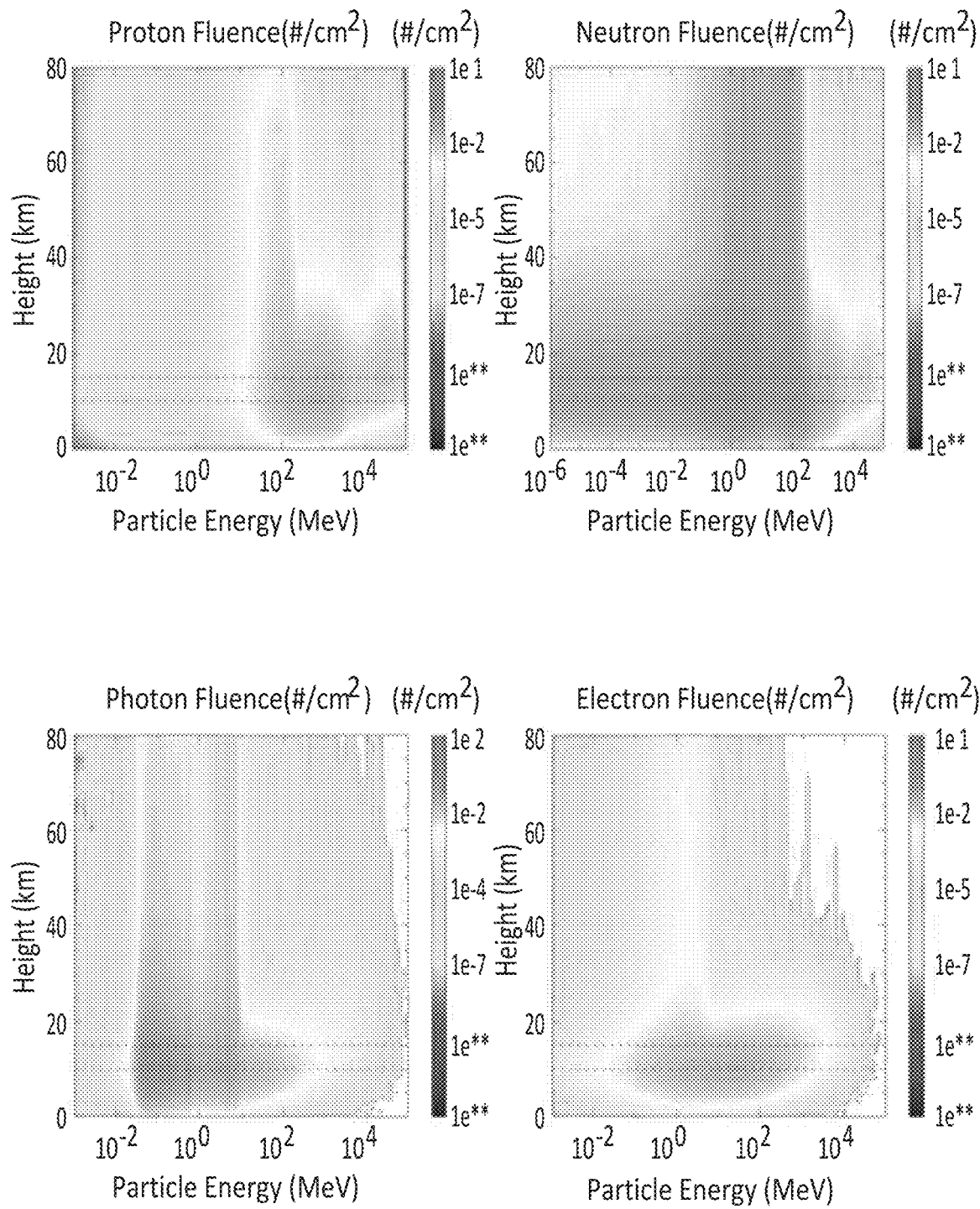
FIG. 19 is a view of fluence depending on particles' species (protons, neutrons, photons and electrons) with regard to heights as solar protons having 100 GeV are incident on the Earth's atmosphere.

Under the foregoing conditions, results of a GEANT4 computer simulation are as follows. As shown in FIG. 19, if one photon of 100 GeV is incident on the height of 80 km, 100 GeV proton fluence of about ~1/cm² is shown at a higher altitude.

It will be understood that a neutron, an electron and a photon of various energy levels are generated from the one species of primary particles, i.e. the 100 GeV proton. In particular, a lot of particles are generated by a strong nuclear interaction in between the surface of the Earth and the height of 20 km, thereby causing high fluence of consequent particles.

Since the 100 GeV protons are generally involved in only the galactic cosmic ray spectrum, a strong galactic cosmic ray spectrum may have a large effect on even the surface of the Earth as well as a flight height.

In the foregoing results, the proton, the electron and the photon show $10^{-3}$-$10^5$ MeV, and the neutron shows $10^{-6}$-$10^5$ MeV. This is because fluence-effective radiation dose (2000, Pelliccioni) conversion coefficients are provided up to very low energy ($2.5 \times 10^8$ MeV) with regard to only the neutron.

Figure 20:
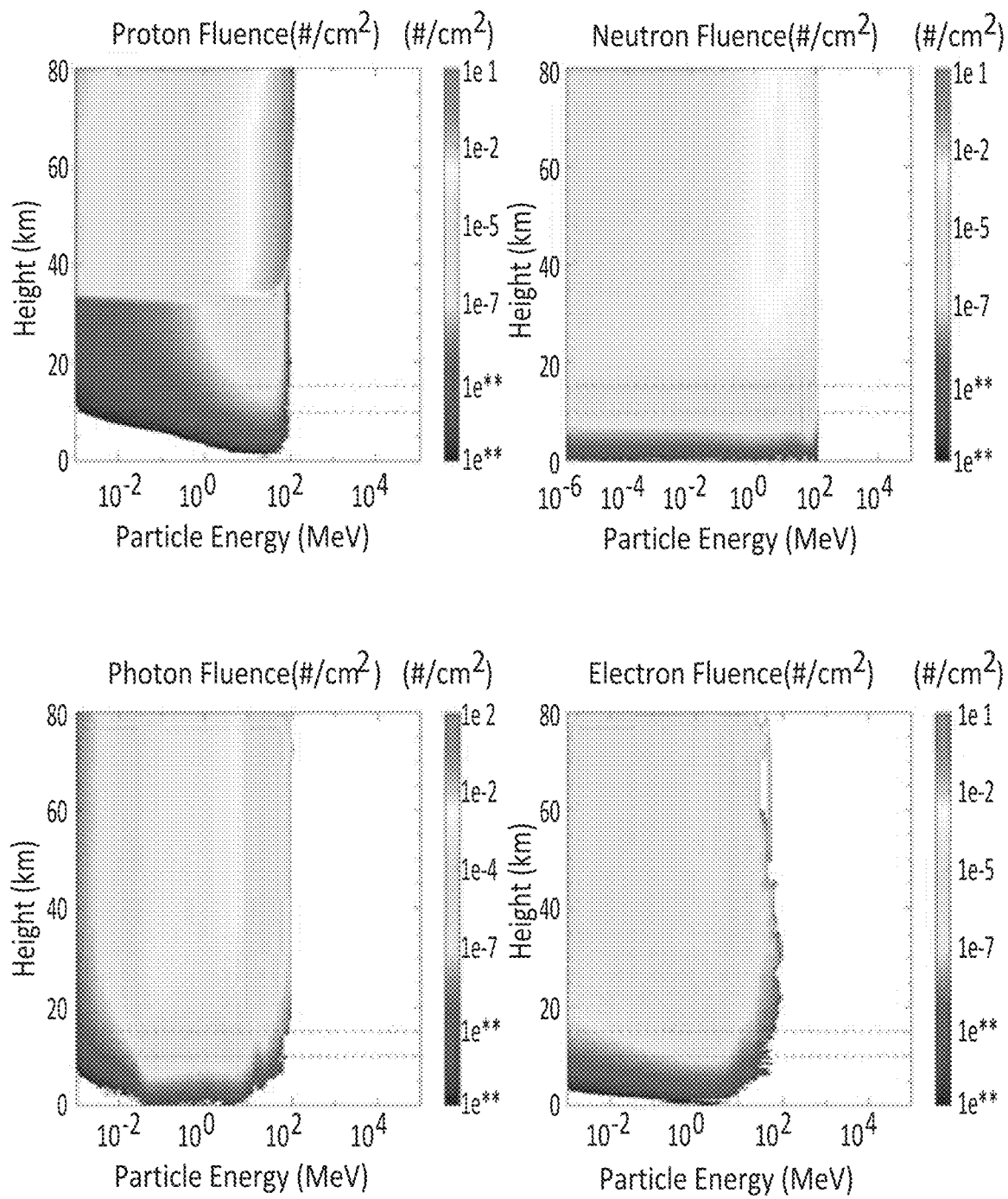
FIG. 20 is a view of fluence depending on particles' species (protons, neutrons, photons and electrons) with regard to heights as solar protons having 5 GeV are incident on the Earth's atmosphere.

When a 5 GeV proton is incident, results of a GEANT4 computer simulation are as shown in FIG. 20.

This case is similar to the foregoing case where the 100 GeV proton is incident, but the fluence is less than that of 100 GeV.

In case of the proton, secondary particles having energy of 100 MeV-50 GeV are generated at a height of 40 km or lower and distributed in a flight height, but enter just up to a height of 5 km on the contrary to that of 100 GeV capable of reaching the surface of the Earth. On the other hand, the particles such as the neutron and the photon reach the surface of the Earth, like that of 100 GeV.

Figure 21:
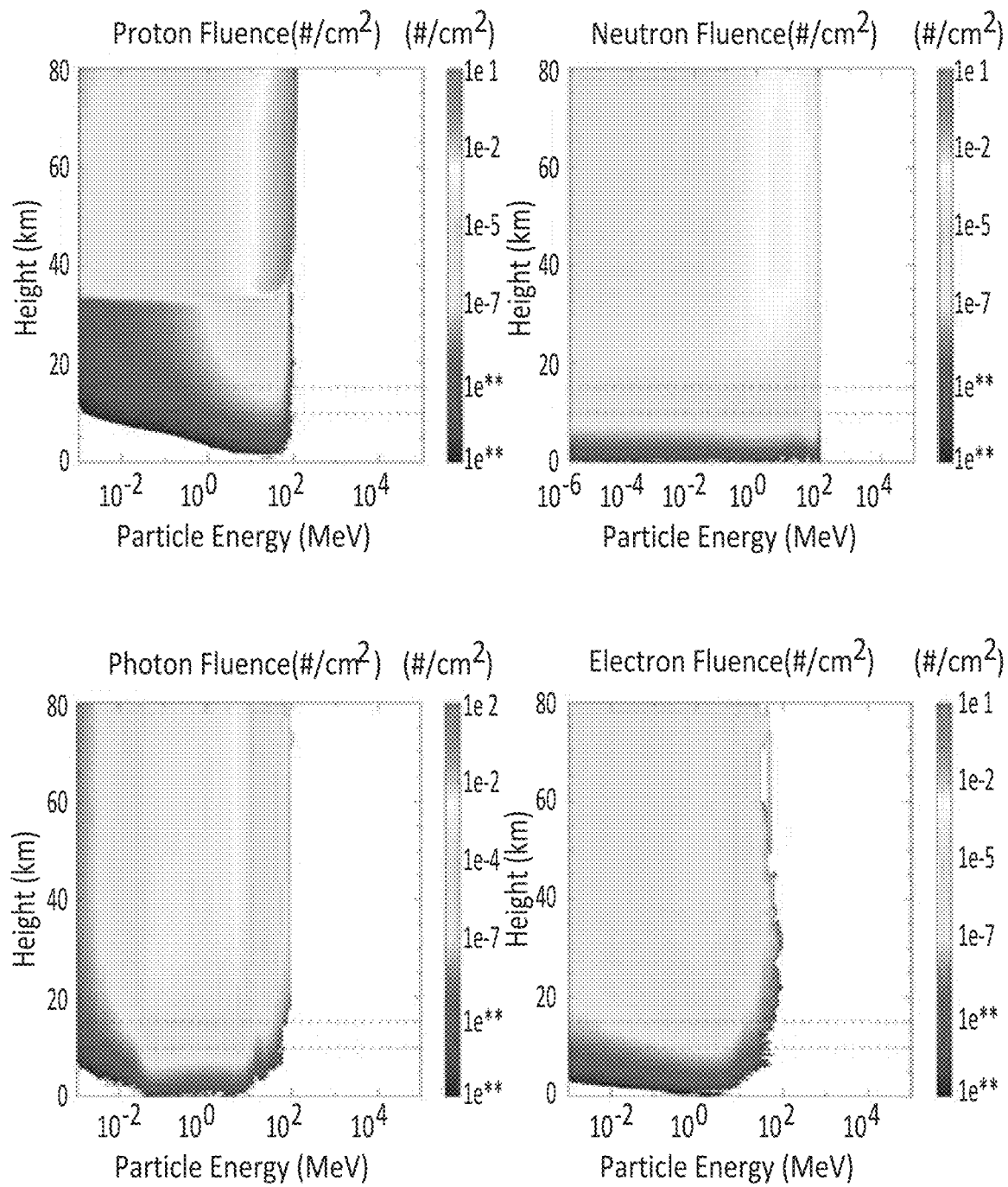
FIG. 21 is a view of fluence depending on particles' species (protons, neutrons, photons and electrons) with regard to heights as solar protons having 100 MeV are incident on the Earth's atmosphere.

When a 100 MeV proton is incident, results of a GEANT4 computer simulation are as shown in FIG. 21.

In case of the proton, its introduction is completely blocked near 35 km on the contrary to the foregoing results. This is because primary particles of 100 MeV incident on 80 km cannot pass any more as response increases near 35 km.

On the other hand, the proton having low energy of 1~50 MeV passes up to a lower height. In case of the neutron and the photon, a boundary is shown near a height of 20 km, and it is thus expected that the radiation dose highly increases at a height of 20 km or higher.

Figure 22:
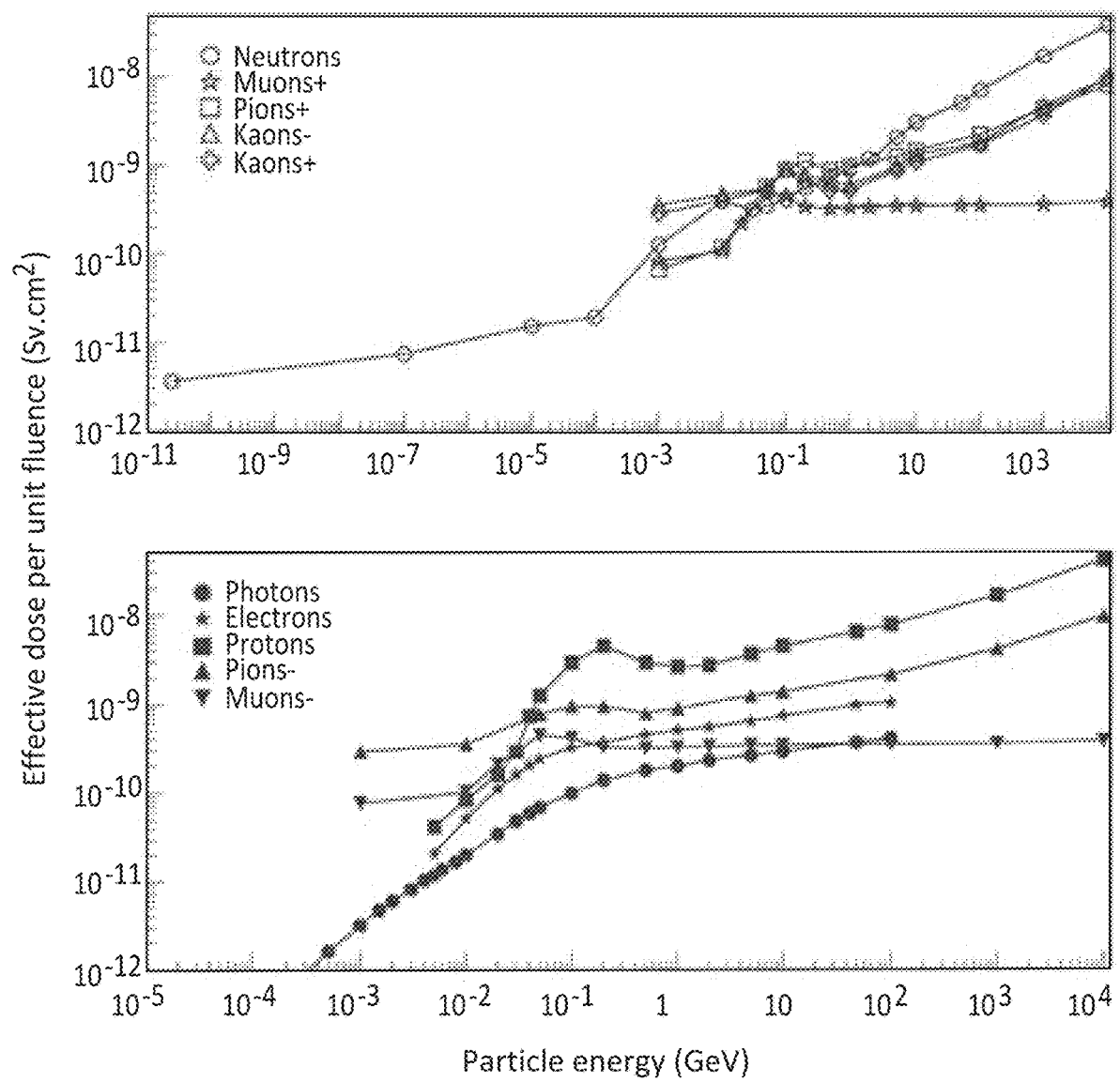
FIG. 22 is a graph of showing the effective dose conversion coefficients with regard to fluence depending on particles' species.

Since it is virtually impossible to directly calculate an effective radiation dose depending on particles' species in the atmosphere, which are calculated based on the relatively simply calculated foregoing relationship between the fluence and the effective dose are used as shown in FIG. 22.

Specifically, detailed particle fluence-effective radiation dose conversion coefficients are as shown in FIG. 23, FIG. 24, FIG. 25 and FIG. 26.

With the foregoing conversion coefficients and fluences of each layer calculated in the cosmic radiation dose analysis model, it is possible to obtain the effective radiation dose caused by one proton having a specific energy according to layers. This information is used to make the response matrix.

Figure 27:
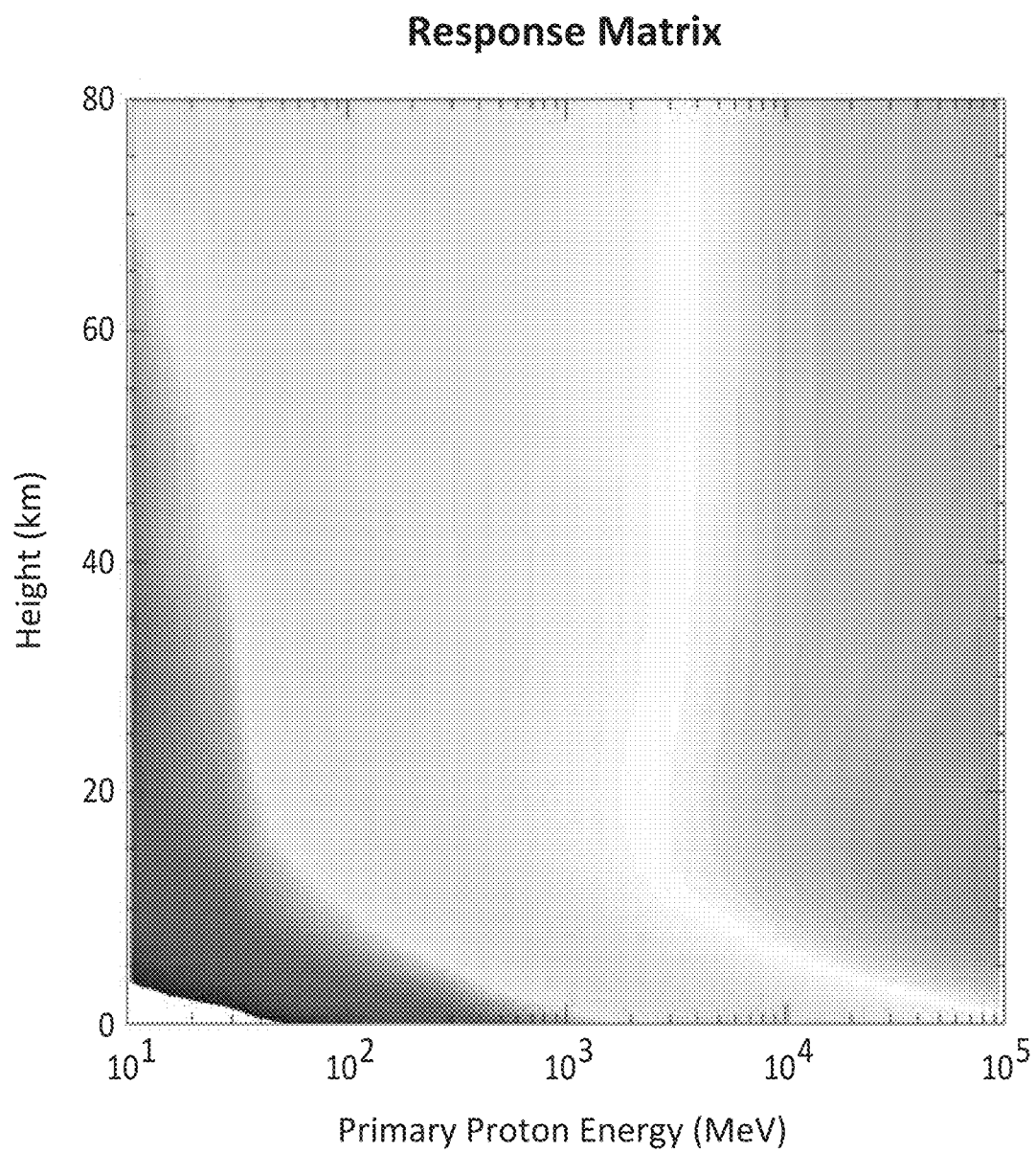
FIG. 27 is a view of showing an effective dose response map (i.e. response matrix) depending on heights with regard to energy of incident protons on the atmosphere.

The response matrix finally produced through the foregoing comprehensive processes is as shown in FIG. 27.

The response matrix of FIG. 27 is given in a 2-dimensional matrix form, in which the axis of abscissa indicates energy of one proton incident on the height of 80 km, the axis of ordinate indicates a height, and the matrix value is the effective radiation dose.

Therefore, it is possible to finally obtain an effective radiation dose caused by a particle spectrum according to heights by applying the response matrix to a galactic cosmic ray and a solar proton spectrum (i.e. the number of particles according to proton energy).

The foregoing effective radiation dose according to the heights may be calculated by the following [Equation 5].

$$D(h) = \sum_{E_P} R(E_P, h) S(E_P) \qquad \text{[Equation 5]}$$

$$R(E_P, h) = \sum_E F(E, E_P, h) C(E)$$

In [Equation 5], D(h) is an effective radiation dose depending on height (h), E is energy of a proton, h is a height, $E_P$ is initial energy of the proton, $S(E_P)$ is a proton spectrum, C(E) is a conversion coefficient, F(E, $E_P$, h) is fluence data, and R =R($E_P$,h) is a response matrix.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

REFERENCE NUMERALS

100: proton spectrum generator
110: first spectrum generator

120: second spectrum generator
130: spectrum merger
200: global radiation dose map producer
210: proton filter
220: global radiation dose map producer
300: global radiation dose map converter
400: database
410: function DB
420: response matrix DB
430: current atmospheric information DB

The invention claimed is:

1. An analysis system for an aviation radiation dose, comprising:
a proton spectrum generator which generates a galactic cosmic ray incident on the Earth's atmosphere and a proton spectrum corresponding to a solar proton event;
a global radiation dose map producer which generates particle transport based on the proton spectrum and produces a radiation dose map;
a global radiation dose map converter which converts the radiation dose map based on the standard atmosphere into a radiation dose map corresponding to current atmosphere conditions in real time; and
a database in which data necessary for operations of the proton spectrum generator, the global radiation dose map producer and the global radiation dose map converter is previously calculated and stored;
wherein the proton spectrum generator comprises:
a first spectrum generator to generate a galactic cosmic ray spectrum by applying a Badhwar-O'Neill 2011 (BO'11) model to a sunspot number;
a second spectrum generator to generate a solar proton spectrum based on a solar proton flux; and
a spectrum merger to generate a full proton spectrum by merging the galactic cosmic ray spectrum generated by the first spectrum generator with the solar proton spectrum generated by the second spectrum generator.

2. The analysis system for the aviation radiation dose according to claim 1, wherein the second spectrum generator generates the solar proton spectrum with the solar proton flux through a solar proton spectrum fitting function stored in a function database.

3. The analysis system for the aviation radiation dose according to claim 1, wherein the spectrum merger generates the full proton spectrum with a result of the galactic cosmic ray spectrum generated by the Badhwar-O'Neill 2011 (BO'11) model with regard to flux larger than 700 MeV while excluding a result of the galactic cosmic ray spectrum less than 605 MeV covered by the solar proton spectrum.

4. The analysis system for the aviation radiation dose according to claim 1, wherein the global radiation dose map producer comprises:
a proton filter which converts a proton spectrum received from the proton spectrum generator into a spectrum at a height of 80 km through a cutoff rigidity model, and removes protons that cannot reach the height of 80 km; and
a global radiation dose map producer which produces a radiation dose map under the standard atmosphere by calculating the proton spectrum and a response matrix stored in a response matrix database.

5. The analysis system for the aviation radiation dose according to claim 4, wherein the response matrix is previously made by arranging results of calculating the particle transport from the height of 80 km to a surface of the Earth in advance by a probabilistic method.

6. The analysis system for the aviation radiation dose according to claim 5, wherein the response matrix is made with atmospheric composition and density information from the surface of the Earth to the height of 80 km by a Monte-Carlo type particle transport code developed for atmosphere geometry and nucleon simulation, and the US standard atmosphere model as an atmosphere model where a particle transports.

7. The analysis system for the aviation radiation dose according to claim 4, wherein the global radiation dose map converter converts a global radiation dose map suitable for the standard atmosphere into a global radiation dose map suitable for current atmospheric conditions with respect to pressure based on a piece of information corresponding to a current time among pieces of atmospheric information stored in a current atmospheric information database.

8. The analysis system for the aviation radiation dose according to claim 7, wherein current atmospheric information database stores results of performing a simulation in advance in order to shorten time to be taken in calculation of a US naval research laboratory mass spectrometer and incoherent scatter radar with exosphere released in a 2000 (NRLMSISE00) model.

9. The analysis system for the aviation radiation dose according to claim 8, wherein the global radiation dose map converter obtains global pressure after matching height intervals of the NRLMSISE00 model at every location with height intervals used in making the response matrix, obtains a height value corresponding to pressure in the US standard atmosphere with regard to pressure by linear interpolation, and produces a radiation dose map based on the NRLMSISE00 model by putting values of the radiation dose map in atmospheric information of the NRLMSISE00 model made out with the height value in accordance with heights.

* * * * *